United States Patent
Wu et al.

(10) Patent No.: US 12,132,686 B2
(45) Date of Patent: Oct. 29, 2024

(54) METHOD AND DEVICE IN NODES USED FOR WIRELESS COMMUNICATION

(71) Applicants: Keying Wu, Shanghai (CN); Xiaobo Zhang, Shanghai (CN)

(72) Inventors: Keying Wu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 421 days.

(21) Appl. No.: 17/564,233

(22) Filed: Dec. 29, 2021

(65) Prior Publication Data

US 2022/0209928 A1    Jun. 30, 2022

(30) Foreign Application Priority Data

Dec. 30, 2020  (CN) .......................... 202011616661.9

(51) Int. Cl.
*H04L 5/00* (2006.01)
*H04B 7/0413* (2017.01)
(Continued)

(52) U.S. Cl.
CPC .......... *H04L 5/0094* (2013.01); *H04L 5/0035* (2013.01); *H04W 24/10* (2013.01);
(Continued)

(58) Field of Classification Search
None
See application file for complete search history.

(56) References Cited

U.S. PATENT DOCUMENTS 11,997,664 B2 * 5/2024 Bai ..................... H04B 7/0413
2020/0100311 A1 * 3/2020 Cirik ..................... H04W 72/23
(Continued)

FOREIGN PATENT DOCUMENTS

| CN | 109391300 A | 2/2019 |
| CN | 110474730 A | 11/2019 |

(Continued)

OTHER PUBLICATIONS

First Office Action of Chinese patent application No. CN202011616661.9 dated Feb. 8, 2024.
(Continued)

*Primary Examiner* — German Viana Di Prisco

(57) ABSTRACT

The present disclosure provides a method and device in a node for wireless communications. A first node transmits a first signal, and the first signal is used for random access; in response to transmitting the first signal, monitors a first-type channel in a first resource set to detect a first-type signaling; monitors the first-type channel in a second resource set to detect a second-type signaling; receives a target signaling, the target signaling is used to determine a target time; and when the target signaling is a third-type signaling, in response to receiving the target signaling, stops monitoring the first-type channel in the first resource set after the target time; when the target signaling is a fourth-type signaling, in response to receiving the target signaling. The above method can quickly recover a beam for unicast service and a beam for PTM/multicast groupcast service after beam failure.

20 Claims, 5 Drawing Sheets

(51) Int. Cl.
*H04W 4/06* (2009.01)
*H04W 24/10* (2009.01)
*H04W 74/0833* (2024.01)

(52) U.S. Cl.
CPC ....... *H04W 74/0833* (2013.01); *H04B 7/0413* (2013.01); *H04W 4/06* (2013.01)

(56) References Cited

U.S. PATENT DOCUMENTS

2021/0410220 A1* 12/2021 Liu .................. H04W 76/19
2022/0190906 A1*  6/2022 Haghighat ........ H04W 74/0841
2023/0038936 A1*  2/2023 Zheng ................ H04L 1/1854

FOREIGN PATENT DOCUMENTS

CN     110677909 A      1/2020
CN     112118585 A     12/2020
WO    2019214649 A1   11/2019

OTHER PUBLICATIONS

First Search Report of Chinese patent application No. CN202011616661.9 dated Feb. 7, 2024.
ETSI MCC "Report of 3GPP TSG RAN2#112-e meeting, Online" 3GPP TSG-RAN WG2 meeting #113-e R2-2100001 Nov. 13, 2020.

* cited by examiner

First signal —being used to determine→ First reference signal
FIG. 6
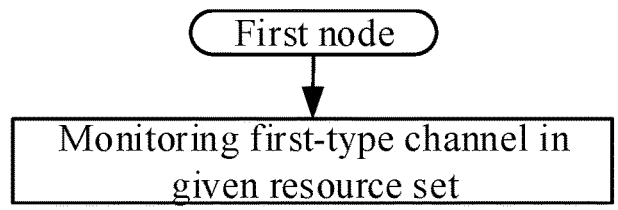
FIG. 7
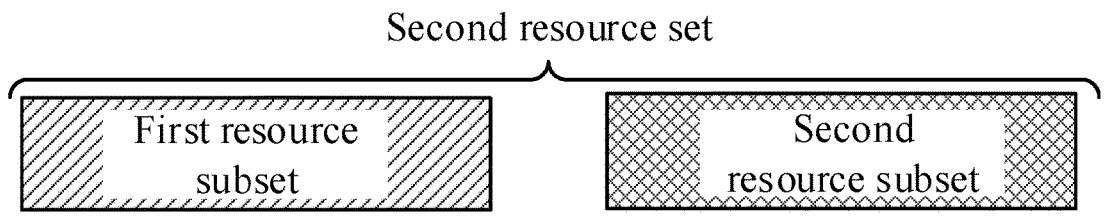
FIG. 8
Target signaling —being used to determine→ Target time
FIG. 9
First reference signal group —being used to determine→ First-type receiving quality group
FIG. 10
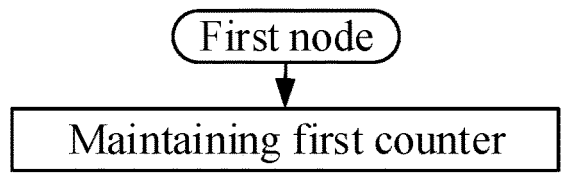
FIG. 11
M reference signals —being used to determine→ M second-type receiving quality
FIG. 12

METHOD AND DEVICE IN NODES USED FOR WIRELESS COMMUNICATION

CROSS REFERENCE TO RELATED APPLICATIONS

This application claims the priority benefit of Chinese Patent Application 202011616661.9, filed on Dec. 30, 2020, the full disclosure of which is incorporated herein by reference.

BACKGROUND

Technical Field

The present disclosure relates to transmission methods and devices in wireless communication systems, and in particular to a transmission method and device of a radio signal in a wireless communication system supporting cellular networks.

Related Art

How to support transmission of multicast and broadcast service under 5G architecture has been already discussed in New Radio (NR) Release (R)-17 standard. In traditional Long-Term Evolution (LTE) and Long-Term Evolution Advanced (LTE-A) systems, a base station supports a terminal to receive multicast groupcast service through Multicast Broadcast Single Frequency Network (MBSFN) by the method of Single-Cell Point-To-Multipoint (SC-PTM).

Massive MIMO is one of key technologies of NR system, Massive MIMO matrix form through beamforming a relatively narrow beam to point energy in a specific direction, so as to improve communication quality. Since beams formed by the Massive MIMO matrix are relatively narrow, beams from both sides of communications shall be aligned to enable effective communications. For this purpose, the NR system introduces a beam management mechanism, including beam measurement, feedback, update, indication and other functions.

SUMMARY

Compared with traditional multicast groupcast service, differences of PTM/multicast groupcast service in NR system include that beam gains of Massive MIMO matrix can be utilized to improve the performance of PTM/multicast groupcast service. How to enhance the existing beam management mechanism to support the PTM/multicast groupcast service is a problem to be solved. To address the above problem, the present disclosure provides a solution. It should be noted that although the above description adopts PTM/groupcast multicast as an example, the present disclosure is also applicable to other scenarios, such as unicast transmission, where similar technical effects can be achieved. Besides, a unified solution for different scenarios (including but not limited to PTM/multicast groupcast and unicast transmission) can also help reduce hardware complexity and cost. If no conflict is incurred, embodiments in a first node in the present disclosure and the characteristics of the embodiments are also applicable to a second node, and vice versa. And the embodiments in the present disclosure and the characteristics in the embodiments can be arbitrarily combined if there is no conflict.

In one embodiment, interpretations of the terminology in the present disclosure refer to definitions given in the 3GPP TS36 series.

In one embodiment, interpretations of the terminology in the present disclosure refer to definitions given in the 3GPP TS38 series.

In one embodiment, interpretations of the terminology in the present disclosure refer to definitions given in the 3GPP TS37 series.

In one embodiment, interpretations of the terminology in the present disclosure refer to definitions given in Institute of Electrical and Electronics Engineers (IEEE) protocol specifications.

The present disclosure provides a method in a first node for wireless communications, comprising:
  transmitting a first signal;
  in response to the behavior of transmitting the first signal, monitoring a first-type channel to detect a first-type signaling in a first resource set;
  monitoring the first-type channel to detect a second-type signaling in a second resource set;
  receiving a target signaling, the target signaling being used to determine a target time; and
  in response to the behavior of receiving the target signaling, stopping monitoring the first-type channel to detect the first-type signaling in the first resource set after the target time or stopping monitoring the first-type channel to detect the second-type signaling in the second resource set after the target time;
  herein, the first signal is used for random access, and the first signal is used to determine a first reference signal; for the first-type channel monitoring performed in the first resource set, the first node assumes QCL parameters same as the first reference signal; the target signaling is a third-type signaling or a fourth-type signaling; when the target signaling is a said third-type signaling, the first node stops monitoring the first-type channel to detect the first-type signaling in the first resource set after the target time; and when the target signaling is a said fourth-type signaling, the first node stops monitoring the first-type channel to detect the second-type signaling in the second resource set after the target time.

In one embodiment, a problem to be solved in the present disclosure includes: for beam-based PTM/multicast groupcast service, how to utilize the beam failure recovery mechanism to quickly update a beam for PTM/multicast groupcast service.

In one embodiment, characteristics of the above method include: the first-type signaling is for unicast service, and the second-type signaling is for PTM/multicast groupcast service. In the above method, after transmitting a beam failure recovery request, a UE monitors beam failure recovery request responses for unicast service and PTM/multicast groupcast service respectively, so as to solve the above problem.

In one embodiment, advantages of the above method include: a beam for unicast service and a beam for PTM/multicast groupcast service can be quickly recovered after a beam failure, which reduces the influence of beam failure on the two types of services.

In one embodiment, advantages of the above method include: unicast service and PTM/multicast groupcast service are allowed to be updated onto different beams after beam recovery to satisfy their own requirements.

According to one aspect of the present disclosure, comprising:

receiving a first reference signal group to determine a first-type receiving quality group; and maintaining a first counter;

herein, the first reference signal group comprises at least one reference signal, and the first-type receiving quality group comprises at least one first-type receiving quality; the first-type receiving quality group is used to maintain the first counter; and in response to a value of the first counter being not less than a first threshold, the first signal is triggered.

According to one aspect of the present disclosure, comprising:

receiving M reference signals, M being a positive integer greater than 1;

herein, measurements performed on the M reference signals are respectively used to determine M second-type receiving qualities; and the first reference signal is one of the M reference signals.

According to one aspect of the present disclosure, it is characterized in that for the first-type channel monitoring performed in the second resource set, the first node assumes QCL parameters same as the first reference signal.

According to one aspect of the present disclosure, it is characterized in that the first signal is used to determine a second reference signal; for the first-type channel monitoring performed in the second resource set, the first node assumes QCL parameters same as the second reference signal.

In one embodiment, advantages of the above method include: after beam failure, a UE can recommend beams for unicast service and PTM/multicast groupcast service respectively to further improve beam gains of the two types of services.

According to one aspect of the present disclosure, comprising at least one of the following:

receiving a first signaling; and receiving a second signal;

herein, the first signaling is used to determine scheduling information of the second signal; the first signaling is a said first-type signaling or a said second-type signaling; when the first signaling is a said first-type signaling, a first index is used to generate a scrambling sequence of the second signal; when the first signaling is a said second-type signaling, a second index is used to generate a scrambling sequence of the second signal; the first index and the second index are respectively integers, and the first index is not equal to the second index.

According to one aspect of the present disclosure, comprising:

receiving a first information block;

herein, the first information block is used to determine the first resource set.

According to one aspect of the present disclosure, comprising:

receiving a first information block;

herein, the first information block is used to determine the second resource set.

According to one aspect of the present disclosure, comprising:

receiving a first information block;

herein, the first information block is used to determine the first resource set and the second resource set.

According to one aspect of the present disclosure, it is characterized in that the first node is a UE.

According to one aspect of the present disclosure, it is characterized in that the first node is a relay node.

The present disclosure provides a method in a second node for wireless communications, comprising:

receiving a first signal;

transmitting a first-type signaling in a first resource set;

transmitting a second-type signaling in a second resource set;

transmitting a target signaling, the target signaling being used to determine a target time; and stopping transmitting the first-type signaling in the first resource set after the target time, or, stopping transmitting the second-type signaling in the second resource set after the target time;

herein, the first signal is used for random access, and the first signal is used to determine a first reference signal; in response to a behavior of transmitting the first signal, a transmitter of the first signal monitors a first-type channel to detect the first-type signaling in the first resource set and monitors the first-type signaling to detect the second-type signaling in the second resource set; for the first-type channel monitoring performed in the first resource set, the transmitter of the first signal assumes a QCL parameter same as the first reference signal; the target signaling is a third-type signaling or a fourth-type signaling; when the target signaling is a said third-type signaling, the second node stops transmitting the first-type signaling in the first resource set after the target time; and when the target signaling is a said fourth-type signaling, the second node stops transmitting the second-type signaling in the second resource set after the target time.

According to one aspect of the present disclosure, comprising:

transmitting a first reference signal group;

herein, a measurement performed on the first reference signal group is used to determine a first-type receiving quality group, the first reference signal group comprises at least one reference signal, and the first-type receiving quality group comprises at least one first-type receiving quality; the first-type receiving quality group is used to maintain a first counter; and in response to a value of the first counter being not less than a first threshold, the first signal is triggered.

According to one aspect of the present disclosure, comprising:

transmitting M reference signals, M being a positive integer greater than 1;

herein, measurements performed on the M reference signals are respectively used to determine M second-type receiving qualities; and the first reference signal is one of the M reference signals.

According to one aspect of the present disclosure, it is characterized in that for the first-type channel monitoring performed in the second resource set, the transmitter of the first signal assumes a QCL parameter same as the first reference signal.

According to one aspect of the present disclosure, it is characterized in that the first signal is used to determine a second reference signal; for the first-type channel monitoring performed in the second resource set, the transmitter of the first signal assumes a QCL parameter same as the second reference signal.

According to one aspect of the present disclosure, comprising at least one of the following:

transmitting a first signaling; and transmitting a second signal;

herein, the first signaling is used to determine scheduling information of the second signal; the first signaling is a said first-type signaling or a said second-type signaling; when the first signaling is a said first-type signaling, a first index is used to generate a scrambling sequence of the second signal; when the first signaling is a said second-type signaling, a second index is used to generate a scrambling sequence of the second signal; the first index and the second index are respectively integers, and the first index is not equal to the second index.

According to one aspect of the present disclosure, comprising:

transmitting a first information block;

herein, the first information block is used to determine the first resource set.

According to one aspect of the present disclosure, comprising:

transmitting a first information block;

herein, the first information block is used to determine the second resource set.

According to one aspect of the present disclosure, comprising:

transmitting a first information block;

herein, the first information block is used to determine the first resource set and the second resource set.

According to one aspect of the present disclosure, wherein the second node is a base station.

According to one aspect of the present disclosure, wherein the second node is a UE.

According to one aspect of the present disclosure, wherein the second node is a relay node.

The present disclosure provides a first node for wireless communication, comprising:

a first transmitter, transmitting a first signal;

a first processor, in response to the behavior of transmitting the first signal, monitoring a first-type channel to detect a first-type signaling in a first resource set;

the first processor, monitoring the first-type channel to detect a second-type signaling in a second resource set;

the first processor, receiving a target signaling, the target signaling being used to determine a target time; and the first processor, in response to the behavior of receiving the target signaling, stopping monitoring the first-type channel to detect the first-type signaling in the first resource set after the target time or stopping monitoring the first-type channel to detect the second-type signaling in the second resource set after the target time;

herein, the first signal is used for random access, and the first signal is used to determine a first reference signal; for the first-type channel monitoring performed in the first resource set, the first node assumes QCL parameters same as the first reference signal; the target signaling is a third-type signaling or a fourth-type signaling; when the target signaling is a said third-type signaling, the first node stops monitoring the first-type channel to detect the first-type signaling in the first resource set after the target time; and when the target signaling is a said fourth-type signaling, the first node stops monitoring the first-type channel to detect the second-type signaling in the second resource set after the target time.

The present disclosure provides a second node for wireless communications, comprising:

a first receiver, receiving a first signal;

a second transmitter, transmitting a first-type signaling in a first resource set;

the second transmitter, transmitting a second-type signaling in a second resource set;

the second transmitter, transmitting a target signaling, the target signaling being used to determine a target time; and the second transmitter, stopping transmitting the first-type signaling in the first resource set after the target time, or, stopping transmitting the second-type signaling in the second resource set after the target time;

herein, the first signal is used for random access, and the first signal is used to determine a first reference signal; in response to a behavior of transmitting the first signal, a transmitter of the first signal monitors a first-type channel to detect the first-type signaling in the first resource set and monitors the first-type signaling to detect the second-type signaling in the second resource set; for the first-type channel monitoring performed in the first resource set, the transmitter of the first signal assumes a QCL parameter same as the first reference signal; the target signaling is a third-type signaling or a fourth-type signaling; when the target signaling is a said third-type signaling, the second node stops transmitting the first-type signaling in the first resource set after the target time; and when the target signaling is a said fourth-type signaling, the second node stops transmitting the second-type signaling in the second resource set after the target time.

In one embodiment, the present disclosure has the following advantages over conventional schemes:

a beam for unicast service and a beam for PTM/multicast groupcast service can be quickly recovered after a beam failure, which reduces the influence of beam failure on PTM/multicast groupcast service.

unicast service and PTM/multicast groupcast service are allowed to be updated onto different beams after beam recovery to satisfy their own requirements.

BRIEF DESCRIPTION OF THE DRAWINGS

Other features, objects and advantages of the present disclosure will become more apparent from the detailed description of non-restrictive embodiments taken in conjunction with the following drawings:

FIG. 6 illustrates a schematic diagram of a first signal being used to determine a first reference signal according to one embodiment of the present disclosure;

FIG. 7 illustrates a schematic diagram of a first node monitoring a first-type channel in a given resource set according to one embodiment of the present disclosure;

FIG. 8 illustrates a schematic diagram of a second resource set according to one embodiment of the present disclosure;

FIG. 9 illustrates a schematic diagram of a target signaling being used to determine a target time according to one embodiment of the present disclosure;

FIG. 10 illustrates a schematic diagram of a first reference signal group being used to determine a first-type receiving quality group according to one embodiment of the present disclosure;

FIG. 11 illustrates a schematic diagram of a first node maintaining a first counter according to one embodiment of the present disclosure;

FIG. 12 illustrates a schematic diagram of M reference signals being used to determine M second-type receiving qualities according to one embodiment of the present disclosure;

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
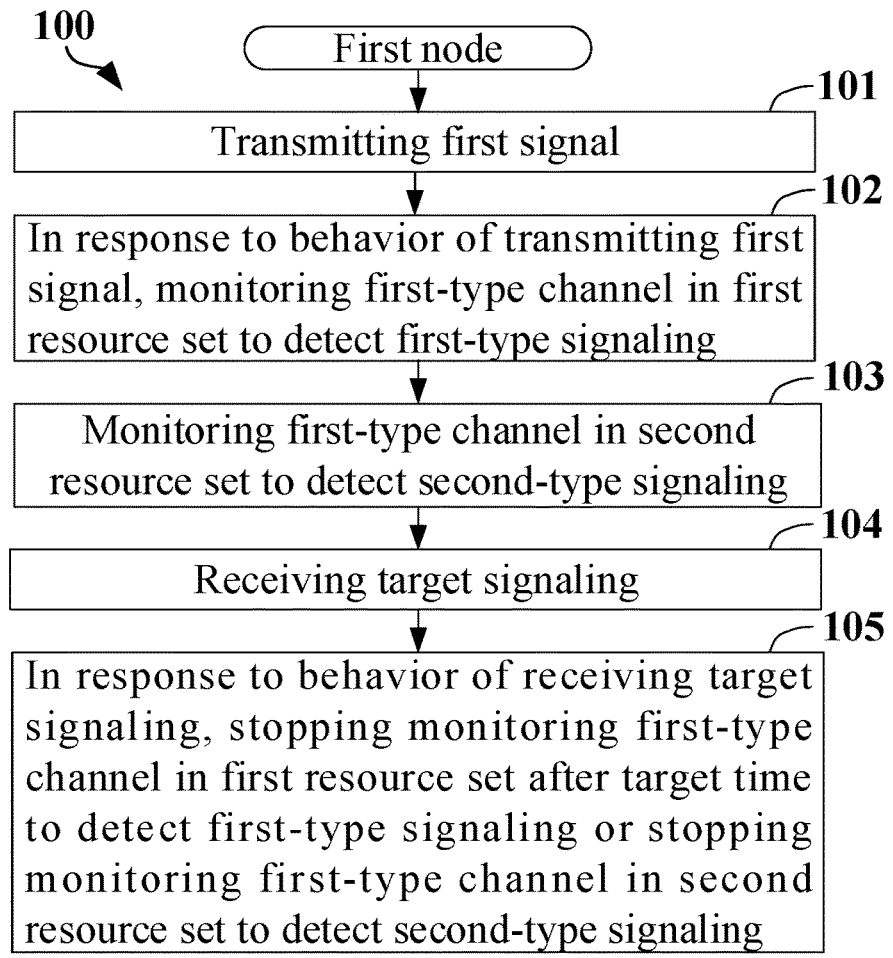
FIG. 1 illustrates a flowchart of a first signal, a first-type signaling, a second-type signaling and a target signaling according to one embodiment of the present disclosure.

Embodiment 1 illustrates a flowchart of a first signal, a first-type signaling, a second-type signaling and a target signaling according to one embodiment of the present disclosure, as shown in FIG. 1. In step 100 illustrated by FIG. 1, each box represents a step. Particularly, the sequential order of steps in these boxes does not necessarily mean that the steps are chronologically arranged.

In Embodiment 1, the first node in the present disclosure transmits a first signal in step 101; in step 102, in response to the behavior of transmitting the first signal, monitors a first-type channel to detect a first-type signaling in a first resource set; in step 103, monitors the first-type channel to detect a second-type signaling in a second resource set; in step 104, receives a target signaling; in step 105, in response to the behavior of receiving the target signaling, stops monitoring the first-type channel to detect the first-type signaling in the first resource set after a target time or stops monitoring the first-type channel to detect the second-type signaling in the second resource set after the target time; herein, the target signaling is used to determine the target time; the first signal is used for random access, and the first signal is used to determine a first reference signal; for the first-type channel monitoring performed in the first resource set, the first node assumes QCL parameters same as the first reference signal; the target signaling is a third-type signaling or a fourth-type signaling; when the target signaling is a said third-type signaling, the first node stops monitoring the first-type channel to detect the first-type signaling in the first resource set after the target time; and when the target signaling is a said fourth-type signaling, the first node stops monitoring the first-type channel to detect the second-type signaling in the second resource set after the target time.

In one embodiment, in response to the behavior of transmitting the first signal, the first node monitors the first-type channel to detect the second-type signaling in the second resource set.

In one embodiment, when the target signaling is a said third-type signaling, and in response to the behavior of receiving the target signaling, the first node stops monitoring the first-type channel to detect the first-type signaling in the first resource set after the target time.

In one embodiment, when the target signaling is a said third-type signaling, and in response to the behavior of receiving the target signaling, the first node stops monitoring the first-type channel to detect the first-type signaling in the first resource set starting from the target time.

In one embodiment, when the target signaling is a said fourth-type signaling, and in response to the behavior of receiving the target signaling, the first node stops monitoring the first-type channel to detect the second-type signaling in the second resource set after the target time.

In one embodiment, when the target signaling is a said fourth-type signaling, and in response to the behavior of receiving the target signaling, the first node stops monitoring the first-type channel to detect the second-type signaling in the second resource set starting from the target time.

In one embodiment, if the target signaling is the third-type signaling, the first node stops monitoring the first-type channel to detect the first-type signaling in the first resource set after the target time; and if the target signaling is a said fourth-type signaling, the first node stops monitoring the first-type channel to detect the second-type signaling in the second resource set after the target time.

In one embodiment, if the target signaling is a said third-type signaling, the first node continues monitoring the first-type channel to detect the second-type signaling in the second resource set after the target time.

In one embodiment, if the target signaling is a said third-type signaling and the first node does not receive the fourth-type signaling after transmitting the first signal and before the third time, the first node continues monitoring the first-type channel to detect the second-type signaling in the second resource set after the target time.

In one embodiment, if the target signaling is a said fourth-type signaling, the first node continues monitoring the first-type channel to detect the first-type signaling in the first resource set after the target time.

In one embodiment, if the target signaling is the fourth-type signaling and the first node does not receive the third-type signaling after transmitting the first signal and before a third time, the first node continues monitoring the first-type channel to detect the first-type signaling in the first resource set after the target time.

In one embodiment, if the target signaling is the third-type signaling, whether the first node continues monitoring the first-type channel to detect the second-type signaling in the second resource set after the target time is unrelated to the target signaling.

In one embodiment, if the target signaling is the fourth-type signaling, whether the first node continues monitoring the first-type channel to detect the first-type signaling in the first resource set after the target time is unrelated to the target signaling.

In one embodiment, the third time is the target time.

In one embodiment, the third time is earlier than the target time.

In one embodiment, a time interval between the third time and the target time is fixed.

In one embodiment, a time interval between the third time and the target time does not need to be configured.

In one embodiment, a time interval between the third time and the target time is configured by a higher-layer parameter.

In one embodiment, time-domain resources occupied by the target signaling are used to determine the third time.

In one embodiment, the third time is an end time of time-domain resources occupied by the target signaling.

In one embodiment, the third time is a start time of time-domain resources occupied by the target signaling.

In one embodiment, the third time is an end time of a time unit occupied by the target signaling.

In one embodiment, the third time is a start time of a time unit occupied by the target signaling.

In one embodiment, one of the time unit is a slot.

In one embodiment, one of the time unit is a sub-slot.

In one embodiment, one of the time unit is a symbol.

In one embodiment, one of the time unit comprises more than one consecutive symbols.

In one embodiment, a number of symbols comprised in one of the time unit is configured by a higher-layer parameter.

In one embodiment, the symbol is an Orthogonal Frequency Division Multiplexing (OFDM) symbol.

In one embodiment, the symbol is a Single Carrier-Frequency Division Multiple Access (SC-FDMA) symbol.

In one embodiment, the symbol is a Discrete Fourier Transform Spread OFDM (DFT-S-OFDM) symbol.

In one embodiment, after transmitting the first signal and before receiving the target signaling, the first node receives neither the third-type signaling nor the fourth-type signaling.

In one embodiment, after transmitting the first signal and before the target time, the first node receives neither the third-type signaling nor the fourth-type signaling except the target signaling.

In one embodiment, after transmitting the first signal and before the third time, the first node receives neither the third-type signaling nor the fourth-type signaling except the target signaling.

In one embodiment, the target signaling is a said third-type signaling, and the first node stops monitoring the first-type channel to detect the first-type signaling in the first resource set after the target time.

In one embodiment, the target signaling is a said fourth-type signaling, and the first node stops monitoring the first-type channel to detect the second-type signaling in the second resource set after the target time.

In one embodiment, in response to the behavior of transmitting the first signal, the first node monitors the first-type channel to detect the first-type signaling in the first resource set starting from the second time; and time-domain resources occupied by the first signal are used to determine the second time.

In one embodiment, in response to the behavior of transmitting the first signal, the first node monitors the first-type channel to detect the second-type signaling in the second resource set starting from the second time; and time-domain resources occupied by the first signal are used to determine the second time.

In one embodiment, the first signal occupies a time unit n in time domain, and the second time is a start time of a time unit (n+a first interval); and the first interval is a non-negative integer.

In one embodiment, the first interval is fixed.

In one embodiment, the first interval is fixed to 4.

In one embodiment, the first interval is configured by a higher-layer parameter.

In one embodiment, the first signal comprises a baseband signal.

In one embodiment, the first signal comprises a radio signal.

In one embodiment, the first signal comprises a radio-frequency signal.

In one embodiment, the first signal comprises a first characteristic sequence.

In one embodiment, the first characteristic sequence comprises one or more of a pseudo-random sequence, a Zadoff-Chu sequence, or a low Peak-to-Average Power Ratio (PAPR) sequence.

In one embodiment, the first characteristic sequence comprises a Cyclic Prefix (CP).

In one embodiment, the first signal comprises a Random Access Preamble.

In one embodiment, the first radio signal comprises a Random Access Channel (RACH) Preamble.

In one embodiment, the first signal comprises a content-free random access preamble.

In one embodiment, the first signal comprises a contention-based random access preamble.

In one embodiment, the first signal comprises a random access preamble used for a Beam Failure Recovery Request.

In one embodiment, the first signal comprises Uplink control information (UCI).

In one embodiment, the first signal comprises a Link Recovery Request (LRR).

In one embodiment, the first signal comprises a Medium Access Control layer Control Element (MAC CE).

In one embodiment, the first signal comprises a Beam Failure Recovery (BFR) MAC CE or a truncated BFR MAC CE.

In one embodiment, the first signal comprises a MsgA.

In one embodiment, the first signal comprises a Msg1.

In one embodiment, the first signal comprises a Msg3.

In one embodiment, a channel occupied by the first signal comprises a Physical Random Access CHannel (PRACH).

In one embodiment, a channel occupied by the first signal comprises a Physical Uplink Shared CHannel (PUSCH).

In one embodiment, a channel occupied by the first signal comprises a Physical Uplink Control Channel (PUCCH).

In one embodiment, radio resources occupied by the first signal comprise PRACH resources.

In one embodiment, PRACH resources occupied by the first signal implicitly indicate a time-frequency resource position of a PUSCH occupied by the first signal.

In one embodiment, the first reference signal comprises a downlink reference signal.

In one embodiment, the first reference signal comprises an uplink reference signal.

In one embodiment, the first reference signal comprises a Channel State Information-Reference Signal (CSI-RS).

In one embodiment, the first reference signal comprises CSI-RS resources.

In one embodiment, the first reference signal comprises a Non-Zero Power (NZP) CSI-RS.

In one embodiment, the first reference signal comprises a Synchronization Signal/physical broadcast channel Block (SSB).

In one embodiment, the first reference signal comprises a Sounding Reference Signal (SRS).

In one embodiment, the first reference signal is CSI-RS resources or an SSB.

In one embodiment, the first reference signal is a periodic reference signal.

In one embodiment, the first reference signal is semi-persistent reference signal.

In one embodiment, the reference signal comprises a reference signal resource.

In one embodiment, the reference signal comprises a reference signal port.

In one embodiment, a modulation symbol comprised in the reference signal is known to the first node.

In one embodiment, the first resource set occupies at least one Resource Element (RE) in time-frequency domain.

In one embodiment, an RE occupies a symbol in time domain, and a subcarrier in frequency domain.

In one embodiment, the first resource set occupies at least one symbol in time domain.

In one embodiment, the first resource set occupies at least one Physical Resource block (PRB) in frequency domain.

In one embodiment, the first resource set comprises a search space set.

In one embodiment, the first resource set is a search space set.

In one embodiment, the first resource set comprises a plurality of Physical Downlink Control Channel (PDCCH) candidates.

In one embodiment, the first resource set comprises partial PDCCH candidates in a search space set.

In one embodiment, the first resource set comprises a COntrol REsource SET (CORESET).

In one embodiment, the first resource set is a CORESET.

In one embodiment, the first resource set occurs periodically in time domain.

In one embodiment, the first resource set occurs a plurality of times in time domain.

In one embodiment, the first resource set occurs only once in time domain.

In one embodiment, a search space set to which the first resource set belongs is identified by a recoverySearchSpaceId.

In one embodiment, the first resource set is a search space set, and the first resource set is identified by a recoverySearchSpaceId.

In one embodiment, a SearchSpaceId corresponding to a search space set to which the first resource set belongs is equal to a recoverySearchSpaceId.

In one embodiment, the first resource set is a search space set, and a SearchSpaceId corresponding to the first resource set is equal to a recoverySearchSpaceId.

In one embodiment, the first resource set is configured by a first higher-layer parameter.

In one embodiment, the first resource set is a search space set, and a first higher-layer parameter indicates a SearchSpaceId corresponding to the first resource set.

In one embodiment, the first higher-layer parameter comprises information comprised in a recovery SearchSpaceId field in a BeamFailureRecoveryConfig Information Element (IE).

In one embodiment, a name of the first higher-layer parameter comprises a recovery SearchSpaceId.

In one embodiment, the second resource set occupies at least one RE in time-frequency domain.

In one embodiment, the second resource set occupies at least one symbol in time domain.

In one embodiment, the second resource set occupies at least one PRB in frequency domain.

In one embodiment, the second resource set comprises a search space set.

In one embodiment, the second resource set is a search space set.

In one embodiment, the second resource set comprises a plurality of PDCCH candidates.

In one embodiment, the second resource set comprises partial PDCCH candidates in a search space set.

In one embodiment, the second resource set comprises a CORESET.

In one embodiment, the second resource set is a CORESET.

In one embodiment, the second resource set occurs periodically in time domain.

In one embodiment, the second resource set occurs a plurality of times in time domain.

In one embodiment, the second resource set occurs only once in time domain.

In one embodiment, the second resource set is the first resource set.

In one embodiment, the second resource set is the same as the first resource set.

In one embodiment, the second resource set is the first resource set; in response of the behavior of transmitting the first signal, the first node monitors the first-type channel to detect the first-type signaling and the second-type signaling in the first resource set.

In one embodiment, the first resource set comprises the second resource set.

In one embodiment, the second resource set comprises the first resource set.

In one embodiment, the first resource set and the second resource set belong to a same search space set.

In one embodiment, the first resource set and the second resource set respectively comprise PDCCH candidates of a same search space set in different monitoring occasions.

In one embodiment, the first resource set and the second resource set are orthogonal in time domain.

In one embodiment, the first resource set and the second resource set are overlapped in time domain.

In one embodiment, a start time of the second resource set is later than a first of the first-type signaling detected in the first resource set.

In one embodiment, a start time of the second resource set is after 28 symbols after an end symbol of a first of the first-type signaling detected in the first resource set.

In one embodiment, the second resource set is associated to a CORESET indexed as 0.

In one embodiment, the behavior of monitoring the first-type channel to detect the first-type signaling in the first resource set in response to the behavior of transmitting the first signal is earlier than the behavior of monitoring the first-type channel to detect the second-type signaling in the second resource set in response to the behavior of transmitting the first signal.

In one embodiment, after firstly detecting the first-type signaling in the first resource set, the first node starts monitoring the first-type channel to detect the second-type signaling in the second resource set.

In one embodiment, in response to the behavior of transmitting the first signal and a behavior of detecting a first of the first-type signaling in the first resource set, the first node monitors the first-type channel to detect the second-type signaling in the second resource set.

In one embodiment, in response to a behavior of detecting a first of the first-type signaling in the first resource set, the first node monitors the first-type channel to detect the second-type signaling in the second resource set.

In one embodiment, the first resource set and the second resource set respectively belong to two different search space sets.

In one embodiment, the first resource set and the second resource set respectively correspond to different SearchSpaceIds.

In one embodiment, a search space set to which the first resource set belongs and a search space set to which the second resource set belongs respectively correspond to different SearchSpaceIds.

In one embodiment, the first resource set and the second resource set are associated with a same CORESET.

In one embodiment, the first resource set and the second resource set are respectively associated with different CORESETs.

In one embodiment, a CORESET associated with the first resource set and a CORESET associated with the second resource set correspond to different ControlResourceSetIds.

In one embodiment, the first resource set and the second resource set belong to a same carrier.

In one embodiment, the first resource set and the second resource set belong to a same BandWidth Part (BWP).

In one embodiment, the first resource set and the second resource set belong to a same cell.

In one embodiment, the meaning of the phrase of monitoring a first-type channel includes: monitoring a Downlink control information (DCI) format transmitted in the first-type channel.

In one embodiment, the meaning of the phrase of monitoring a first-type channel includes: monitoring a PDCCH candidate to judge whether the first-type channel is transmitted.

In one embodiment, the meaning of the phrase of monitoring a first-type channel includes: monitoring a PDCCH candidate to judge whether the first-type channel is transmitted in a PDCCH candidate.

In one embodiment, the meaning of the phrase of monitoring a first-type channel includes: monitoring a PDCCH candidate to judge whether a DCI format is detected in a PDCCH candidate.

In one embodiment, the meaning of the phrase of monitoring a first-type channel includes: monitoring a PDCCH candidate to judge whether a DCI format being transmitted in the first-type channel is detected in a PDCCH candidate.

In one embodiment, the monitoring refers to blind decoding, and the meaning of the phrase of monitoring a first-type channel includes: executing a decoding operation in a PDCCH candidate; if the decoding is determined as correct according to a Cyclic Redundancy Check (CRC), judging that the first-type channel being transmitted is detected; otherwise judging that the first-type channel is not detected.

In one embodiment, the monitoring refers to blind decoding, and the meaning of the phrase of monitoring a first-type channel includes: executing a decoding operation in a PDCCH candidate; if the decoding is determined as correct according to a CRC, judging that a DCI format is detected; otherwise judging that a DCI format is not detected.

In one embodiment, the monitoring refers to blind decoding, and the meaning of the phrase of monitoring a first-type channel includes: executing a decoding operation in a PDCCH candidate; if the decoding is determined as correct in a PDCCH candidate according to a CRC, judging that a DCI format being transmitted in the first-type channel is detected in the a PDCCH candidate; otherwise judging that a DCI format is not detected in the a PDCCH candidate.

In one embodiment, the monitoring refers to coherent detection, and the meaning of the phrase of monitoring a first-type channel includes: executing a coherent reception in a PDCCH candidate and measuring energy of a signal obtained after the coherent reception; if the energy of the signal obtained after the coherent reception is greater than a first given threshold in a PDCCH candidate, judging that a DCI format is detected to be transmitted in the first-type channel in the a PDCCH candidate; otherwise judging that a DCI format is not detected in the a PDCCH candidate.

In one embodiment, the monitoring refers to energy detection, and the meaning of the phrase of monitoring a first-type channel includes: sensing energy of a radio signal in a PDCCH candidate to average to obtain received energy; if the received energy is greater than a second given threshold in a PDCCH candidate, judging that a DCI format is detected to be transmitted in the first-type channel in the a PDCCH candidate; otherwise judging that a DCI format is not detected in the a PDCCH candidate.

In one embodiment, the meaning of the phrase of monitoring a first-type channel includes: determining whether the first-type channel is transmitted according to a CRC, and not determining whether the first-type channel is transmitted before judging whether decoding is correct according to a CRC.

In one embodiment, the meaning of the phrase of monitoring a first-type channel includes: determining whether there exists DCI being transmitted in the first-type channel according to a CRC, and not determining whether there exists DCI being transmitted in the first-type channel before judging whether decoding is correct according to a CRC.

In one embodiment, the meaning of the phrase of monitoring a first-type channel includes: determining whether the first-type channel is transmitted according to a coherent detection; and not determining whether the first-type channel is transmitted before a coherent detection.

In one embodiment, the meaning of the phrase of monitoring a first-type channel includes: determining whether there exists DCI being transmitted in the first-type channel according to a coherent detection; and not determining whether exists DCI being transmitted in the first-type channel before a coherent detection.

In one embodiment, the meaning of the phrase of monitoring a first-type channel includes: determining whether the first-type channel is transmitted according to an energy detection; and not determining whether the first-type channel is transmitted before an energy detection.

In one embodiment, the meaning of the phrase of monitoring a first-type channel includes: determining whether there exists DCI being transmitted in the first-type channel according to an energy detection; and not determining whether exists DCI being transmitted in the first-type channel before an energy detection.

In one embodiment, the meaning of the phrase of monitoring a first-type channel to detect a first-type signaling in a first resource set includes: judging whether the first-type signaling is detected by monitoring the first-type channel in the first resource set.

In one embodiment, the meaning of the phrase of monitoring the first-type channel to detect a second-type signaling in a second resource set includes: judging whether the second-type signaling is detected by monitoring the first-type channel in the second resource set.

In one embodiment, the meaning of the phrase of stopping monitoring the first-type channel to detect the first-type signaling in the first resource set after the target time includes: stopping monitoring the first-type channel to judge whether the first-type signaling is detected in the first resource set after the target time.

In one embodiment, the meaning of the phrase of stopping monitoring the first-type channel to detect the second-type signaling in the second resource set after the target time includes: stopping monitoring the first-type channel to judge whether the second-type signaling is detected in the second resource set after the target time.

In one embodiment, the meaning of the phrase of stopping monitoring the first-type channel to detect the first-type signaling in the first resource set after the target time includes: stopping monitoring the first-type channel in the first resource set after the target time.

In one embodiment, the meaning of the phrase of stopping monitoring the first-type channel to detect the second-type signaling in the second resource set after the target time includes: stopping monitoring the first-type channel in the second resource set after the target time.

In one embodiment, the meaning of the phrase of stopping monitoring the first-type channel to detect the first-type signaling in the first resource set after the target time includes: stopping detecting the first-type signaling in the first resource set after the target time.

In one embodiment, the meaning of the phrase of stopping monitoring the first-type channel to detect the second-type signaling in the second resource set after the target time includes: stopping detecting the second-type signaling in the second resource set after the target time.

In one embodiment, the first-type channel comprises a physical channel.

In one embodiment, the first-type channel is a physical channel.

In one embodiment, the first-type channel comprises an L1 channel.

In one embodiment, the first-type channel is an L1 channel.

In one embodiment, the first-type channel comprises a downlink physical layer control channel (i.e., a downlink channel only capable of carrying a physical layer signaling).

In one embodiment, the first-type channel comprises a PDCCH.

In one embodiment, the first-type channel is a PDCCH.

In one embodiment, the first-type signaling is a physical-layer signaling.

In one embodiment, the first-type signaling is a dynamic signaling.

In one embodiment, the first-type signaling is an L1 signaling.

In one embodiment, the first-type signaling comprises DCI.

In one embodiment, the first-type signaling comprises a DCI format.

In one embodiment, the first-type signaling comprises a UE specific DCI.

In one embodiment, the first-type signaling comprises a DCI format in which a CRC is scrambled by a Radio Network Temporary Identifier (RNTI) in a first identifier set, and the first identifier set comprises at least one RNTI.

In one embodiment, the first-type signaling is a DCI format in which a CRC is scrambled by an RNTI in a first identifier set, and the first identifier set comprises at least one RNTI.

In one embodiment, the first identifier set comprises a Cell-RNTI (C-RNTI).

In one embodiment, the first identifier set only comprises a C-RNTI.

In one embodiment, the first identifier set comprises a Modulation and Coding Scheme (MCS)-C-RNTI.

In one embodiment, the first identifier set consists of a C-RNTI and an MCS-C-RNTI.

In one embodiment, the first identifier set comprises a Configured Scheduling (CS)-RNTI.

In one embodiment, the first identifier set comprises a UE specific RNTI.

In one embodiment, the first identifier set does not comprise a group common RNTI.

In one embodiment, any RNTI in the first identifier set is a UE specific RNTI.

In one embodiment, a DCI format corresponding to any the first-type signaling belongs to a first format set, and the first format set comprises at least one DCI format.

In one embodiment, the first format set comprises at least one of DCI format 1_0, DCI format 1_1 or DCI format 1_2.

In one embodiment, the second-type signaling is a physical-layer signaling.

In one embodiment, the second-type signaling is a dynamic signaling.

In one embodiment, the second-type signaling is a L1 signaling.

In one embodiment, the second-type signaling comprises DCI.

In one embodiment, the second-type signaling comprises a DCI format.

In one embodiment, the second-type signaling comprises a UE specific DCI.

In one embodiment, the second-type signaling comprises a DCI format in which a CRC is scrambled by a second identifier set, and the second identifier set comprises at least one RNTI.

In one embodiment, the second-type signaling is a DCI format in which a CRC is scrambled by a second identifier set, and the second identifier set comprises at least one RNTI.

In one embodiment, the second identifier set comprises a C-RNTI.

In one embodiment, the second identifier set does not comprise a C-RNTI.

In one embodiment, the second identifier set comprises a Group-RNTI (G-RNTI).

In one embodiment, the second identifier set comprises a Multicast-RNTI (M-RNTI).

In one embodiment, the second identifier set comprises a Group Common-RNTI (GC-RNTI).

In one embodiment, the second identifier set comprises a Single Carrier-Point to Multipoint-RNTI (SC-PTM-RNTI).

In one embodiment, the second identifier set comprises a UE specific RNTI.

In one embodiment, any RNTI in the second identifier set is a UE specific RNTI.

In one embodiment, the second identifier set does not comprise a UE specific RNTI.

In one embodiment, the second identifier set comprises a group common RNTI.

In one embodiment, any RNTI in the second identifier set is a group common RNTI.

In one embodiment, the second identifier set does not comprise a group common RNTI.

In one embodiment, there exists an RNTI in the second identifier set not belonging to the first identifier set.

In one embodiment, there exists an RNTI in the first identifier set not belonging to the second identifier set.

In one embodiment, any RNTI in the second identifier set does not belong to the first identifier set.

In one embodiment, any RNTI in the first identifier set does not belong to the second identifier set.

In one embodiment, a DCI format corresponding to any the second-type signaling belongs to a second format set, and the second format set comprises at least one DCI format.

In one embodiment, the second format set comprises at least one of DCI format 1_0, DCI format 1_1 or DCI format 1_2.

In one embodiment, the second format set is the first format set.

In one embodiment, there exists a DCI format in the second format set not belonging to the first format set.

In one embodiment, there exists a DCI format in the first format set not belonging to the second format set.

In one embodiment, a CRC of the first-type signaling and a CRC of the second-type signaling are scrambled by different RNTIs.

In one embodiment, the first-type signaling and the second-type signaling correspond to different DCI formats.

In one embodiment, both the first-type signaling and the second-type signaling comprise a first field, and the first field comprises at least one binary bit; a value of the first field in any the first-type signaling is equal to a first value, and a value of the first field in any the second-type signaling is equal to a second value; the first value is not equal to the second value.

In one embodiment, a first RNTI is used to generate a scrambling sequence of a Physical Downlink Shared CHannel (PDSCH) scheduled by a the first-type signaling, and a second RNTI is used to generate a scrambling sequence of a PDSCH scheduled by a said second-type signaling; the first RNTI is not equal to the second RNTI.

In one embodiment, the third-type signaling comprises a higher-layer signaling.

In one embodiment, the third-type signaling is a higher-layer signaling.

In one embodiment, the third-type signaling comprises a MAC CE.

In one embodiment, the third-type signaling comprises a Radio Resource Control (RRC) signaling.

In one embodiment, the third-type signaling comprises a Transmission Configuration Indicator (TCI) state activated MAC CE.

In one embodiment, the third-type signaling comprises a TCI state activated/de-activated MAC CE.

In one embodiment, the third-type signaling comprises a UE-specific PDSCH TCI state activated/de-activated MAC CE.

In one embodiment, the third-type signaling comprises a TCI state indicated MAC CE.

In one embodiment, the third-type signaling comprises a UE-specific PDCCH TCI state indicated MAC CE.

In one embodiment, the third-type signaling comprises a higher-layer signaling used to deactivate a TCI state.

In one embodiment, the third-type signaling comprises a higher-layer signaling used to activate a TCI state or any parameter in a tci-StatesPDCCH-ToAddList and/or a tci-StatesPDCCH-ToReleaseList In one embodiment, the third-type signaling comprises a higher-layer signaling used to configure a tci-StatesPDCCH-ToAddList and/or a tci-StatesPDCCH-ToReleaseList.

In one embodiment, the third-type signaling comprises a MAC CE activation command for a TCI state or a tci-StatesPDCCH-ToAddList and/or a tci-StatesPDCCH-ToReleaseList.

In one embodiment, the third-type signaling is used to activate a TCI state.

In one embodiment, any the third-type signaling is used to activate a TCI state.

In one embodiment, the third-type signaling is used to configure a tci-StatesPDCCH-ToAddList and/or a tci-StatesPDCCH-ToReleaseList.

In one embodiment, any the third-type signaling is used to activate a TCI state or any parameter in a tci-StatesPDCCH-ToAddList and/or a tci-StatesPDCCH-ToReleaseList.

In one embodiment, the third-type signaling is transmitted in a PDSCH.

In one embodiment, the fourth-type signaling comprises a higher-layer signaling.

In one embodiment, the fourth-type signaling is a higher-layer signaling.

In one embodiment, the fourth-type signaling comprises a MAC CE.

In one embodiment, the fourth-type signaling comprises an RRC signaling.

In one embodiment, the fourth-type signaling is used to configure multicast service.

In one embodiment, the multicast service comprises Point-To-Multipoint (PTM) service.

In one embodiment, the multicast service comprises multicast service.

In one embodiment, the multicast service comprises broadcast service.

In one embodiment, the multicast service comprises Multimedia Broadcast Multicast Service (MBMS).

In one embodiment, the fourth-type signaling comprises a higher-layer signaling used to deactivate a TCI state.

In one embodiment, the fourth-type signaling comprises a higher-layer signaling used to activate a TCI state or any parameter in a tci-StatesPDCCH-ToAddList and/or a tci-StatesPDCCH-ToReleaseList.

In one embodiment, the fourth-type signaling comprises a MAC CE activation command for a TCI state or a tci-StatesPDCCH-ToAddList and/or a tci-StatesPDCCH-ToReleaseList.

In one embodiment, the fourth-type signaling is transmitted in a PDSCH.

In one embodiment, the third-type signaling and the fourth-type signaling correspond to different radio bearers.

In one embodiment, a CRC of a scheduling signaling of the third-type signaling and a CRC of a scheduling signaling of the fourth-type signaling are scrambled by different RNTIs.

In one embodiment, a CRC of a scheduling signaling of the third-type signaling is scrambled by an RNTI in a third identifier set, and a CRC of a scheduling signaling of the fourth-type signaling is scrambled by an RNTI in a fourth identifier set; the third identifier set and the fourth identifier set respectively comprise at least one RNTI.

In one embodiment, there does exist an RNTI belonging to the third identifier set and the fourth identifier set at the same time.

In one embodiment, there exists an RNTI belonging to the third identifier set and the fourth identifier set at the same time.

In one embodiment, there exists an RNTI in the third identifier set not belonging to the fourth identifier set.

In one embodiment, there exists an RNTI in the fourth identifier set not belonging to the third identifier set.

In one embodiment, the third identifier set comprises a C-RNTI.

In one embodiment, the third identifier set comprises a UE specific RNTI.

In one embodiment, the third identifier set does not comprise a group common RNTI.

In one embodiment, the fourth identifier set does not comprise a C-RNTI.

In one embodiment, the fourth identifier set comprises a G-RNTI.

In one embodiment, the fourth identifier set comprises an M-RNTI.

In one embodiment, the fourth identifier set comprises a GC-RNTI.

In one embodiment, the fourth identifier set comprises an SC-PTM-RNTI.

In one embodiment, the fourth identifier set does not comprise a UE specific RNTI.

In one embodiment, the fourth identifier set comprises a group common RNTI.

In one embodiment, the third-type signaling comprises a UE-dedicated higher-layer signaling; and the fourth-type signaling comprises a group common higher-layer signaling.

In one embodiment, the third-type signaling comprises information in all or partial fields in an IE.

In one embodiment, the fourth-type signaling comprises a System Information Block (SIB).

In one embodiment, the third-type signaling and the fourth-type signaling occupy different types of logical channels.

In one embodiment, a logical channel occupied by the third-type signaling comprises a Dedicated Control Channel (DCCH).

In one embodiment, a logical channel occupied by the third-type signaling comprises a Common Control Channel (CCCH).

In one embodiment, a logical channel occupied by the third-type signaling comprises a Dedicated Traffic Channel (DTCH).

In one embodiment, a logical channel occupied by the fourth-type signaling comprises a Multicast Control Channel (MCCH).

In one embodiment, a logical channel occupied by the fourth-type signaling comprises a Multicast Traffic Channel (MTCH).

In one embodiment, the third-type signaling and the fourth-type signaling occupy different types of transport channels.

In one embodiment, a transport channel occupied by the third-type signaling comprises a Downlink Shared Channel (DL-SCH).

In one embodiment, a transport channel occupied by the fourth-type signaling comprises a Multicast Channel (MCH).

In one embodiment, a transport channel occupied by the fourth-type signaling comprises a Single Carrier (SC)-MCH.

In one embodiment, both the third-type signaling and the fourth-type signaling comprise a second field, the second field comprised in the third-type signaling indicates a CORESET belonging to a first CORESET set, and the second field comprised in the fourth-type signaling indicates a CORESET belonging to a second CORESET set; and the first CORESET set and the second CORESET set respectively comprise at least one CORESET.

In one embodiment, the second field comprises at least one binary bit.

In one embodiment, the second field indicates a CORESET ID.

In one embodiment, a value of the second field is equal to an indicated CORESET ID.

In one embodiment, the second field comprises 4 bits.

In one embodiment, there exists a CORESET in the first CORESET set not belonging to the second CORESET set.

In one embodiment, there exists a CORESET in the second CORESET set not belonging to the first CORESET set.

In one embodiment, the first node does not detect a fifth-type DCI in any search space set associated with any CORESET in the first CORESET set; for any given CORESET in the second CORESET set, the first node detects the fifth DCI in at least one search space set associated with the given CORESET.

In one embodiment, the fifth-type DCI is a group common DCI.

In one embodiment, the fifth-type DCI comprises a group common DCI.

In one embodiment, the fifth-type DCI is transmitted on a group common PDCCH.

In one embodiment, the fifth-type DCI comprises a UE-specific DCI.

In one embodiment, the fifth-type DCI is scrambled by an RNTI in a fifth identifier set, and the fifth identifier set comprises at least one RNTI.

In one subembodiment of the above embodiment, the fifth identifier set comprises a group common RNTI.

In one subembodiment of the above embodiment, the fifth identifier set does not comprise a UE-specific RNTI.

In one subembodiment of the above embodiment, the fifth identifier set comprises a G-RNTI.

In one subembodiment of the above embodiment, the fifth identifier set comprises an M-RNTI.

In one subembodiment of the above embodiment, the fifth identifier set comprises an SC-PTM-RNTI.

In one embodiment, a DCI format of the fifth-type DCI belongs to a third format set, and the third format set comprises at least one DCI format.

In one embodiment, the fifth-type DCI comprises a third field, and the third field comprises at least one binary bit; a value of the third field in any the fifth-type DCI is equal to a third value, and the third value is a non-negative integer.

In one embodiment, the target signaling is carried by a first PDSCH; if the target signaling is a said third-type signaling, a said first-type signaling is used to indicate scheduling information of the first PDSCH.

In one embodiment, the target signaling is carried by a first PDSCH; if the target signaling is a said fourth-type signaling, a said second-type signaling is used to indicate scheduling information of the first PDSCH.

In one embodiment, the scheduling information comprises one or more of time-domain resources, frequency-domain resources, a Modulation and Coding Scheme (MCS), a DeModulation Reference Signals (DMRS) port, a Hybrid Automatic Repeat reQuest (HARD) process number, a Redundancy Version (RV), or a New Data Indicator (NDI).

Embodiment 2

Figure 2:
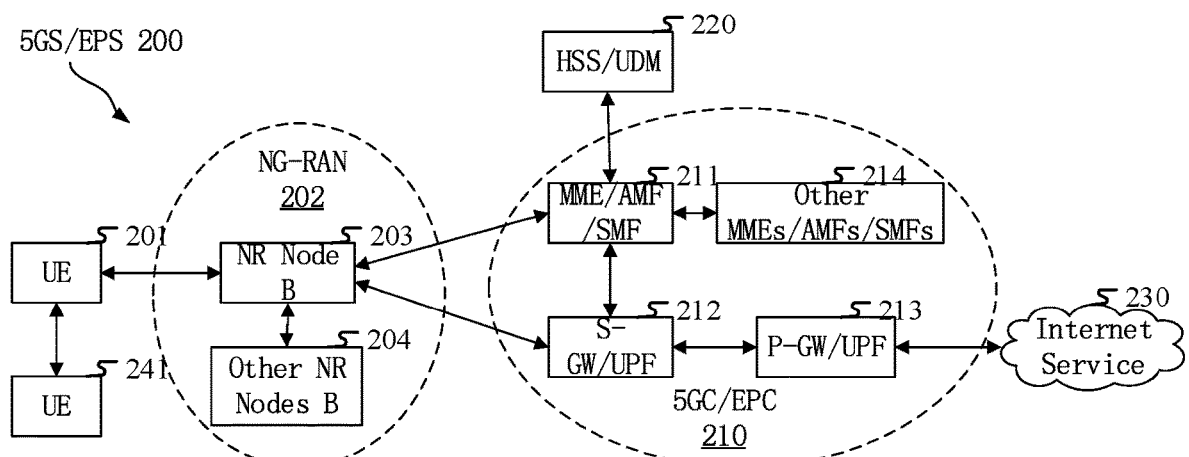
FIG. 2 illustrates a schematic diagram of a network architecture according to one embodiment of the present disclosure.

Embodiment 2 illustrates a schematic diagram of a network architecture according to one embodiment of the present disclosure, as shown in FIG. 2.

FIG. 2 is a diagram illustrating a network architecture 200 of LTE, LTE-A and future 5G systems. The LTE, LTE-A and future 5G systems network architecture 200 may be called an Evolved Packet System (EPS) 200. The 5G NR or LTE network architecture 200 may be called a 5G System (5GS)/Evolved Packet System (EPS) 200 or other appropriate terms. The 5GS/EPS 200 may comprise one or more UEs 201, a UE 241 that is in sidelink communications with a UE 201, an NG-RAN 202, a 5G-Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/ interfaces are not shown. As shown in FIG. 2, the 5GS/EPS 200 provides packet switching services. Those skilled in the art will find it easy to understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), aircrafts, narrow-band physical network devices, machine-type communication devices, land vehicles, automobiles, wearable devices, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Services.

In one embodiment, the first node in the present disclosure comprises the UE 201.

In one embodiment, the second node in the present disclosure comprises the gNB 203.

In one embodiment, a radio link between the UE 201 and the gNB 203 is a cellular network link.

In one embodiment, a transmitter of the first signal in the present disclosure comprises the UE 201.

In one embodiment, a receiver of the first signal in the present disclosure comprises the gNB 203.

In one embodiment, a transmitter of the first-type signaling in the present disclosure comprises the gNB 203.

In one embodiment, a receiver of the first-type signaling in the present disclosure comprises the UE 201.

In one embodiment, a transmitter of the second-type signaling in the present disclosure comprises the gNB 203.

In one embodiment, a receiver of the second-type signaling in the present disclosure comprises the UE 201.

In one embodiment, a transmitter of the target signaling in the present disclosure comprises the gNB 203.

In one embodiment, a receiver of the target signaling in the present disclosure comprises the UE 201.

Embodiment 3

Figure 3:
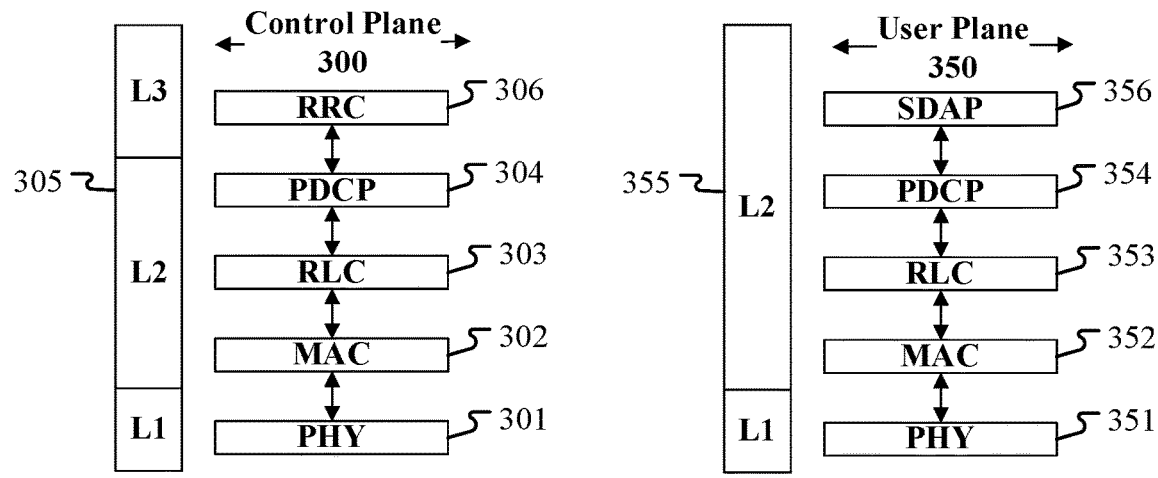
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to one embodiment of the present disclosure, as shown in FIG. 3.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a first communication node (UE, gNB or RSU in V2X) and a second communication node (gNB, UE or RSU in V2X), or between two UEs is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of a link between a first communication node and a second communication node, or between two UEs. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second communication node and a first communication node device. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first signal is generated by the PHY 301 or the PHY 351.

In one embodiment, the first-type signaling is generated by the PHY 301 or the PHY 351.

In one embodiment, the first-type signaling is generated by the MAC sublayer 302 or the MAC sublayer 352.

In one embodiment, the second-type signaling is generated by the PHY 301 or the PHY 351.

In one embodiment, the second-type signaling is generated by the MAC sublayer 302 or the MAC sublayer 352.

In one embodiment, the target signaling is generated by the PHY 301 or the PHY 351.

In one embodiment, the target signaling is generated by the MAC sublayer 302 or the MAC sublayer 352.

Embodiment 4

Figure 4:
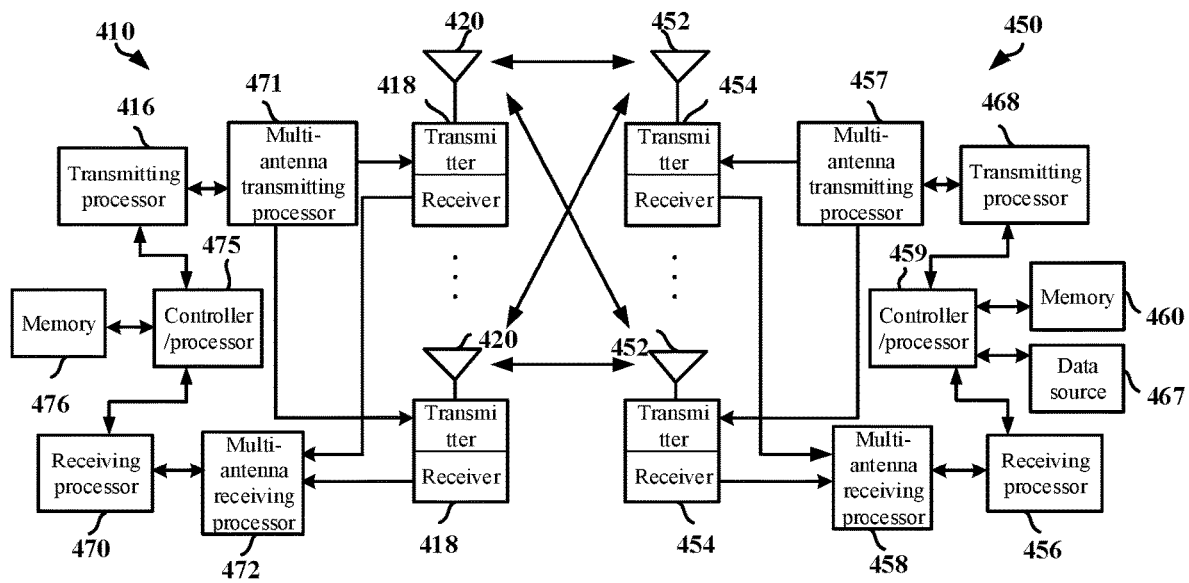
FIG. 4 illustrates a schematic diagram of a first communication device and a second communication device according to one embodiment of the present disclosure.

Embodiment 4 illustrates a schematic diagram of a first communication device and a second communication device according to one embodiment of the present disclosure, as shown in FIG. 4. FIG. 4 is a block diagram of a first communication device 410 in communication with a second communication device 450 in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from the core network is provided to a controller/processor 475. The controller/processor 475 provides a function of the L2 layer. In DL transmission, the controller/processor 475 provides header compression, encryption, packet segmentation and reordering, and multiplexing between a logical channel and a transport channel, and radio resource allocation for the second communication device 450 based on various priorities. The controller/processor 475 is also in charge of HARQ operation, retransmission of a lost packet, and a signaling to the second communication node 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more parallel streams. The transmitting processor 416 then maps each parallel stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted parallel stream. Symbols on each parallel stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In downlink(DL) transmission, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing. The controller/processor 459 also performs error detection using ACK and/or NACK protocols as a way to support HARQ operation.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in DL transmission, the controller/processor 459 performs header compression, encryption, packet segmentation and reordering, and multiplexing between a logical channel and a transport channel based on radio resource allocation of the first communication device 410 so as to provide the L2 layer functions used for the user plane and the control plane. The controller/processor 459 is also responsible for HARQ operation, retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated parallel streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. the controller/processor 475 provides de-multiplexing between a transport channel and a logical channel, packet reassembling, decryption, header decompression, control signal processing so as to recover a higher-layer packet from the second communication device 450. The higher-layer packet coming from the controller/processor 475 may be provided to the core network. The controller/processor 475 can also perform error detection using ACK and/or NACK protocols to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: transmits the first signal; in response to the behavior of transmitting the first signal, monitors the first-type channel to detect the first-type signaling in the first resource set; monitors the first-type channel to detect the second-type signaling in the second resource set; receives the target signaling, the target signaling is used to determine the target time; and in response to the behavior of receiving the target signaling, stops monitoring the first-type channel to detect the first-type signaling in the first resource set after the target time or stops monitoring the first-type channel to detect the second-type signaling in the second resource set after the target time.

In one embodiment, the second communication device 450 comprises a memory that stores a computer readable instruction program. The computer readable instruction program generates an action when executed by at least one processor. The action includes: transmitting the first signal; in response to the behavior of transmitting the first signal, monitoring the first-type channel to detect the first-type signaling in the first resource set; monitoring the first-type channel to detect the second-type signaling in the second resource set; receiving the target signaling, the target signaling being used to determine the target time; and in response to the behavior of receiving the target signaling, stopping monitoring the first-type channel to detect the first-type signaling in the first resource set after the target time or stopping monitoring the first-type channel to detect the second-type signaling in the second resource set after the target time.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: receives the first signal; transmits the first-type signaling in the first resource set; transmits the second-type signaling in the second resource set; transmits the target signaling, the target signaling is used to determine the target time; and stops transmitting the first-type signaling in the first resource set after the target time, or, stops transmitting the second-type signaling in the second resource set after the target time.

In one embodiment, the first communication device 410 comprises a memory that stores a computer readable instruction program. The computer readable instruction program generates an action when executed by at least one processor. The action includes: receiving the first signal; transmitting the first-type signaling in the first resource set; transmitting the second-type signaling in the second resource set; transmitting the target signaling, the target signaling being used to determine the target time; and stopping transmitting the first-type signaling in the first resource set after the target time, or, stopping transmitting the second-type signaling in the second resource set after the target time.

In one embodiment, the first node comprises the second communication device 450 in the present disclosure.

In one embodiment, the second node in the present disclosure comprises the first communication device 410.

In one embodiment, at least one of the antenna 420, the receiver 418, the receiving processor 470, the multi-antenna receiving processor 472, the controller/processor 475 or the memory 476 is used to receive the first signal; at least one of the antenna 452, the transmitter 454, the transmitting processor 468, the multi-antenna transmitting processor 457, the controller/processor 459 or the memory 460 is used to transmit the first signal.

In one embodiment, at least one of the antenna 452, the receiver 454, the receiving processor 456, the multi-antenna receiving processor 458, the controller/processor 459, the memory 460, or the data source 467 is used to monitor the first-type channel to detect the first-type signaling in the first resource set; at least one of the antenna 420, the receiver 418, the receiving processor 416, the multi-antenna transmitting processor 471, the controller/processor 475, or the memory 476 is used to transmit the first-type signaling in the first resource set.

In one embodiment, at least one of the antenna 452, the receiver 454, the receiving processor 456, the multi-antenna receiving processor 458, the controller/processor 459, the memory 460, or the data source 467 is used to monitor the first-type channel to detect the second-type signaling in the second resource set; at least one of the antenna 420, the receiver 418, the receiving processor 416, the multi-antenna transmitting processor 471, the controller/processor 475, or the memory 476 is used to transmit the second-type signaling in the second resource set.

In one embodiment, at least one of the antenna 452, the receiver 454, the receiving processor 456, the multi-antenna receiving processor 458, the controller/processor 459, the memory 460, or the data source 467 is used to receive the target signaling; at least one of the antenna 420, the transmitter 418, the transmitting processor 416, the multi-antenna transmitting processor 471, the controller/processor 475, or the memory 476 is used to transmit the target signaling.

Embodiment 5

Figure 5:
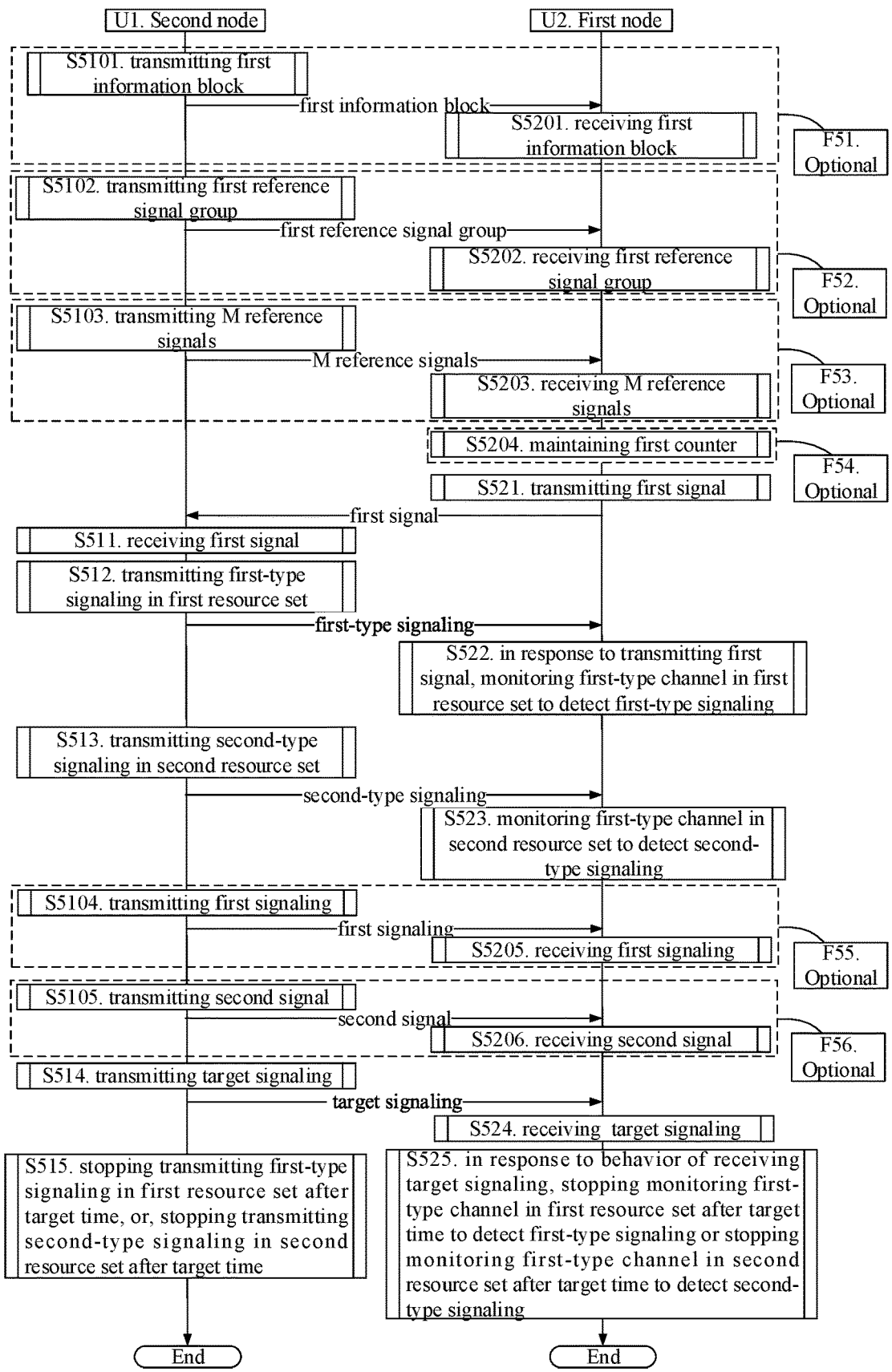
FIG. 5 illustrates a flowchart of wireless communications according to one embodiment of the present disclosure.

Embodiment 5 illustrates a flowchart of wireless transmission according to one embodiment in the present disclosure, as shown in FIG. 5. In FIG. 5, a second node U1 and a first node U2 are communication nodes transmitted via an air interface. In FIG. 5, steps in F51 to F56 are respectively optional.

The second node U1 transmits a first information block in step S5101; transmits a first reference signal group in step S5102; transmits M reference signals in step S5103; receives a first signal in step S511; transmits a first-type signaling in a first resource set in step S512; transmits a second-type signaling in a second resource set in step S513; and transmits a first signaling in step S5104; transmits a second signal in step S5105; transmits a target signaling in step S514; in step S515, stops transmitting the first-type signaling in the first resource set after the target time, or, stops transmitting the second-type signaling in the second resource set after the target time.

The first node U2 receives a first information block in step S5201; receives a first reference signal group in step S5202; receives M reference signals in step S5203; maintains a first counter in step S5204; transmits a first signal in step S521; and in step S522, in response to the behavior of transmitting the first signal, monitors a first-type channel to detect a first-type signaling in a first resource set; in step S523, monitors a first-type channel to detect a second-type signaling in a second resource set; and receives a first-type signaling in step S5205; receives a second signal in step S5206; receives a target signaling in step S524; in step S525, in response to the behavior of receiving the target signaling, stops monitoring the first-type channel to detect the first-type signaling in the first resource set after a target time or stops monitoring the first-type channel to detect the second-type signaling in the second resource set after the target time.

In embodiment 5, the target signaling is used by the first node U2 to determine the target time; the first signal is used for random access, and the first signal is used by the second node U1 to determine a first reference signal; for the first-type channel monitoring performed in the first resource set, the first node U2 assumes a QCL parameter same as the first reference signal; the target signaling is a third-type signaling or a fourth-type signaling; when the target signaling is a said third-type signaling, the first node U2 stops monitoring the first-type channel to detect the first-type signaling in the first resource set after the target time; when the target signaling is a said fourth-type signaling, the first node U2 stops monitoring the first-type channel to detect the second-type signaling in the second resource set after the target time; when the target signaling is one of third-type signaling, the second node U1 stops transmitting the first-type signaling in the first resource set after the target time; and when the target signaling is one of fourth-type signaling, the second node U1 stops transmitting the second-type signaling in the second resource set after the target time.

In one embodiment, the first node U2 is the first node in the present disclosure.

In one embodiment, the second node U1 is the second node in the present disclosure.

In one embodiment, an air interface between the second node U1 and the first node U2 comprises a radio interface between a base station and a UE.

In one embodiment, an air interface between the second node U1 and the first node U2 comprises a radio interface between UEs.

In one embodiment, the second node U1 is a maintenance base station of a serving cell of the first node U2.

In one embodiment, the target signaling is used by the second node U1 to determine the target time.

In one embodiment, in response to the behavior of receiving the first signal, the second node U1 transmits the first-type signaling in the first resource set.

In one embodiment, in response to the behavior of receiving the first signal, the second node U1 transmits the second-type signaling in the second resource set.

In one embodiment, in response to a behavior of transmitting a first of the first-type signaling in the first resource set, the second node transmits the second-type signaling in the second resource set.

In one embodiment, in response to the behavior of transmitting the target signaling, the second node stops transmitting the first-type signaling in the first resource set after the target time or stops transmitting the second-type signaling in the second resource set after the target time.

In one embodiment, when the target signaling is a said third-type signaling, in response to the behavior of transmitting the target signaling, the second node stops transmitting the first-type signaling in the first resource set after the target time.

In one embodiment, when the target signaling is a said fourth-type signaling, and in response to the behavior of transmitting the target signaling, the second node stops transmitting the second-type signaling in the second resource set after the target time.

In one embodiment, the first node U2 firstly detects a said second-type signaling in the second resource set, and then detects a said first-type signaling in the first resource set.

In one embodiment, the first node U2 firstly detects a said first-type signaling in the first resource set, and then detects a said second-type signaling in the second resource set.

In one embodiment, the first-type channel monitoring performed in the first resource set occurs before the first-type channel monitoring performed in the second resource set.

In one embodiment, the first-type channel monitoring performed in the first resource set occurs after the first-type channel monitoring performed in the second resource set.

In one embodiment, the first-type channel monitoring performed in the first resource set and the first-type channel monitoring performed in the second resource set occur alternately in time domain.

In one embodiment, the first-type channel monitoring performed in the first resource set and the first-type channel monitoring performed in the second resource set are overlapped in time domain.

In one embodiment, the first signal is transmitted in a PRACH.

In one embodiment, the first signal is transmitted in a PUSCH.

In one embodiment, the first signal is transmitted in a PUCCH.

In one embodiment, the first signal is transmitted in a PRACH and a PUSCH.

In one embodiment, the first signal is transmitted in a PUCCH and a PUSCH.

In one embodiment, the first-type signaling is transmitted in a PDCCH.

In one embodiment, the second-type signaling is transmitted in a PDCCH.

In one embodiment, the target signaling is transmitted in a PDSCH.

In one embodiment, steps in box F51 in FIG. 5 exist; the first information block is used by the first node U2 to determine at least one of the first resource set or the second resource set.

In one embodiment, a channel occupied by the first information block comprises PDSCH.

In one embodiment, the first information block is transmitted in a PDSCH.

In one embodiment, steps in the box F52 in FIG. 5 exist; the first reference signal is used by the first node U2 to determine a first-type receiving quality group, the first reference signal group comprises at least one reference signal, and the first-type receiving quality group comprises at least one first-type receiving quality.

In one embodiment, there exists a reference signal in the first reference signal group being earlier than the first signal in time domain.

In one embodiment, there exists a reference signal in the first reference signal group being later than the first signal in time domain.

In one embodiment, steps in box F52 and box F54 in FIG. 5 exist; the first-type receiving quality group is used by the first node U2 to maintain the first counter; in response to a value of the first counter being not less than a first threshold, the first signal is triggered.

In one embodiment, steps in box F53 in FIG. 5 exist; measurements performed on the M reference signals are respectively used by the first node U2 to determine M second-type receiving qualities; and the first reference signal is one of the M reference signals.

In one embodiment, there exists one of the M reference signals being earlier than the first signal in time domain.

In one embodiment, there exists one of the M reference signals being later than the first signal in time domain.

In one embodiment, there exists one of the M reference signals being earlier than a reference signal in the first signal group in time domain.

In one embodiment, there exists one of the M reference signals being later than a reference signal in the first signal group in time domain.

In one embodiment, steps in the box F56 in FIG. 5 exist; the first signaling is used to determine scheduling information of the second signal; the first signaling is a said first-type signaling or a said second-type signaling; when the first signaling is a said first-type signaling, a first index is used by the first node U2 to generate a scrambling sequence of the second signal; when the first signaling is a said second-type signaling, a second index is used by the first node U2 to generate a scrambling sequence of the second signal; the first index and the second index are respectively integers, and the first index is not equal to the second index.

In one embodiment, steps in box F55 and box F56 in FIG. 5 exist, and the first node U2 receives the first signaling and the second signal.

In one embodiment, steps in box F55 in FIG. 5 exist, and steps in box F56 do not exist; the first node receives only the first signaling out of the first signaling and the second signal.

In one embodiment, steps in box F55 in FIG. 5 do not exist, and steps in box F56 exist; the first node receives only the second signal out of the first signaling and the second signal.

In one embodiment, a channel occupied by the first signaling comprises a PDCCH.

In one embodiment, the first signaling is transmitted in a PDCCH.

In one embodiment, a channel occupied by the second signal comprises a PDSCH.

In one embodiment, the second signal is transmitted in a PDSCH.

Embodiment 6

Embodiment 6 illustrates a schematic diagram of a first signal being used to determine a first reference signal according to one embodiment of the present disclosure; as shown in FIG. 6.

In one embodiment, PRACH resources occupied by the first signal are used to determine the first reference signal.

In one embodiment, PRACH resources occupied by the first signal belong to a target PRACH resource set in K PRACH resource set(s), K being a positive integer; the K PRACH resource set(s) corresponds(respectively correspond) to K reference signal(s); the first reference signal is one of the K reference signals corresponding to the target PRACH resource set; and any of the K PRACH resource set(s) comprises at least one PRACH resource.

In one embodiment, there exists one of the K PRACH resource set(s) only comprising one PRACH resource.

In one embodiment, there exists one of the K PRACH resource set(s) comprising a plurality of PRACH resources.

In one embodiment, the K PRACH resource set(s) is(are) configured by a higher-layer parameter.

In one embodiment, a higher-layer parameter configuring the K PRACH resource set(s) comprises all or partial information in a candidateBeamRSList field and a candidateBeamRSListExt-v1610 field in a BeamFailureRecoveryConfig IE.

In one embodiment, a corresponding relation between the K PRACH resource set(s) and the K reference signal(s) are configured by a higher-layer parameter.

In one embodiment, a higher-layer parameter configuring a corresponding relation between the K PRACH resource set(s) and the K reference signal(s) comprises all or partial information in a candidateBeamRSList field and a candidateBeamRSListExt-v1610 field in a BeamFailureRecoveryConfig IE.

In one embodiment, a PRACH resource comprises a PRACH occasion.

In one embodiment, a PRACH resource comprises a random access preamble.

In one embodiment, a PRACH resource comprises a random access preamble index.

In one embodiment, a PRACH resource comprises time-frequency resources.

In one embodiment, a random access preamble comprised in the first signal is one of K random access preamble(s), K being a positive integer; the K random access preamble(s) corresponds(respectively correspond) to K reference signals; and the first reference signal is one of the K reference signal(s) corresponding to the random access preamble comprised in the first signal.

In one embodiment, the K random access preamble(s) is(are) configured by a higher-layer parameter.

In one embodiment, a higher-layer parameter configuring the K random access preamble(s) comprises all or partial information in a candidateBeamRSList field and a candidateBeamRSListExt-v1610 field in a BeamFailureRecoveryConfig IE.

In one embodiment, a corresponding relation between the K random access preamble(s) and the K reference signal(s) is configured by a higher layer parameter.

In one embodiment, a higher-layer parameter configuring a corresponding relation between the K random access preamble(s) and the K reference signal(s) comprises all or partial information in a candidateBeamRSList field and a candidateBeamRSListExt-v1610 field in a BeamFailureRecoveryConfig IE.

In one embodiment, K is equal to 1.

In one embodiment, K is greater than 1.

In one embodiment, K is not greater than 16.

In one embodiment, K is not greater than 64.

In one embodiment, the K reference signal(s) comprises (comprise) CSI-RS(s).

In one embodiment, the K reference signal(s) comprises (comprise) an SSB.

In one embodiment, the K reference signal(s) comprises (comprise) an SRS.

In one embodiment, the first signal carries a first bit string, and the first bit string comprises at least one binary bit; and a value of the first bit string indicates the first reference signal.

Embodiment 7

Embodiment 7 illustrates a schematic diagram of a first node monitoring a first-type channel in a given resource set according to one embodiment of the present disclosure, as shown in FIG. 7. In embodiment 7, for the first-type channel monitoring performed in the given resource set, the first node assumes QCL parameters same as a given reference signal; herein, the given resource set is the first resource set or the second resource set, and the given reference signal is the first reference signal or the second reference signal.

In one embodiment, the given resource set is the first resource set, and the given reference signal is the first reference signal.

In one embodiment, the given resource set is the second resource set, and the given reference signal is the first reference signal.

In one embodiment, the given resource set is the second resource set, and the given reference signal is the second reference signal.

In one embodiment, the QCL refers to: Quasi-Co-Located.

In one embodiment, the QCL comprises a QCL Type-A.

In one embodiment, the QCL comprises a QCL Type-B.

In one embodiment, the QCL comprises a QCL Type-C.

In one embodiment, the QCL comprises a QCL Type-D.

In one embodiment, the meaning of the phrase of for the first-type channel monitoring performed in the given resource set, the first node assumes QCL parameters same as a given reference signal includes: the first node assumes that a transmitting antenna port of the first-type channel transmitted in the given resource set and the given reference signal are QCL.

In one subembodiment of the above embodiment, the first node assumes that a transmitting antenna port of the first-type channel transmitted in the given resource set and the given reference signal correspond to QCL-TypeA and/or QCL-TypeD.

In one embodiment, the meaning of the phrase of for the first-type channel monitoring performed in the given resource set, the first node assumes QCL parameters same as a given reference signal includes: the first node assumes that a DMRS of the first-type channel transmitted in the given resource set and the given reference signal are QCL.

In one subembodiment of the above embodiment, the first node assumes that a DMRS of the first-type channel transmitted in the given resource set and the given reference signal correspond to QCL-TypeA and/or QCL-TypeD.

In one embodiment, the meaning of the phrase of for the first-type channel monitoring performed in the given resource set, the first node assumes QCL parameters same as a given reference signal includes: the given reference signal and a fourth reference signal are QCL, and the first node assumes that a transmitting antenna port of the first-type channel transmitted in the given resource set and the fourth reference signal are QCL.

In one embodiment, the meaning of the phrase of for the first-type channel monitoring performed in the given resource set, the first node assumes QCL parameters same as a given reference signal includes: the given reference signal and a fourth reference signal are QCL, and the first node assumes that a DMRS of the first-type channel transmitted in the given resource set and the fourth reference signal are QCL.

In one embodiment, the meaning of the phrase of for the first-type channel monitoring performed in the given resource set, the first node assumes QCL parameters same as a given reference signal includes: the first node uses a same spatial domain filter to receive the given reference signal and monitors the first-type channel in the given resource set.

In one embodiment, the meaning of the phrase of for the first-type channel monitoring performed in the given resource set, the first node assumes QCL parameters same as a given reference signal includes: the first node uses a same spatial domain filter to transmit the given reference signal and monitors the first-type channel in the given resource set.

In one embodiment, the meaning of the phrase of for the first-type channel monitoring performed in the given resource set, the first node assumes QCL parameters same as a given reference signal includes: the given reference signal and a fourth reference signal are QCL, and the first node uses a same spatial domain filter to receive the fourth reference signal and monitors the first-type channel in the given resource set.

In one embodiment, the meaning of the phrase of for the first-type channel monitoring performed in the given resource set, the first node assumes QCL parameters same as a given reference signal includes: large-scale properties of a channel that the given reference signal goes through can be used to infer large-scale properties of a channel that the first-type channel transmitted in the given resource set goes through.

In one embodiment, the meaning of the phrase of for the first-type channel monitoring performed in the given resource set, the first node assumes QCL parameters same as a given reference signal includes: the given reference signal and a fourth reference signal are QCL, large-scale properties of a channel that the fourth reference signal goes through can be used to infer large-scale properties of a channel that the first-type channel transmitted in the given resource set goes through.

In one embodiment, the fourth reference signal comprises an SSB.

In one embodiment, the fourth reference signal comprises a CSI-RS.

Embodiment 8

Embodiment 8 illustrates a schematic diagram of a second resource set according to one embodiment of the present disclosure, as shown in FIG. 8. In embodiment 8, the second resource set comprises a first resource subset and a second resource subset.

In one embodiment, the first resource subset and the second resource subset respectively comprise a plurality of PDCCH candidates.

In one embodiment, the first resource subset and the second resource subset are associated with different CORESETs.

In one embodiment, the first resource subset and the second resource subset belong to different search space sets.

In one embodiment, the first resource subset belongs to the first resource set.

In one embodiment, the first resource subset is the first resource set.

In one embodiment, the first resource subset and the first resource set belong to a same search space set.

In one embodiment, the first resource subset comprises the first resource set.

In one embodiment, the first resource subset and the second resource subset are orthogonal in time domain.

In one embodiment, a start time of the second resource subset is not earlier than an end time of the first resource subset.

In one embodiment, the second resource subset and the first resource set are orthogonal in time domain.

In one embodiment, a start time of the second resource subset is not earlier than an end time of the first resource set.

In one embodiment, a start time of the second resource subset is located after 28 symbols after an end symbol of a first of the first-type signaling detected in the first resource set.

In one embodiment, the first node monitors the first-type channel in the second resource subset to detect the second-type signaling starting from a first time, and the first time is located after 28 symbols after an end symbol of a first of the first-type signaling detected in the first resource set.

In one embodiment, the second resource subset is associated with a CORESET indexed as 0.

In one embodiment, in response to the behavior of transmitting the first signal, the first node monitors the first-type channel to detect the second-type signaling in the first resource sub set.

In one embodiment, in response to the behavior of transmitting the first signal and a behavior of detecting first the first-type signaling in the first resource set, the first node monitors the first-type channel to detect the second-type signaling in the second resource subset.

In one embodiment, in response to a behavior of detecting first the first-type signaling in the first resource set, the first node monitors the first-type channel to detect the second-type signaling in the second resource subset.

In one embodiment, in response to a behavior of detecting a first of the first-type signaling in the first resource set, the first node monitors the first-type channel to detect the second-type signaling in the second resource subset starting from a first time; the first time is located after 28 symbols after an end symbol of a first of the first-type signaling detected in the first resource set.

In one embodiment, in response to a behavior of detecting a first of the first-type signaling in the first resource set, the first node stops monitoring the first-type channel to detect the second-type signaling in the first resource subset.

In one embodiment, the first resource subset is the first resource set; in response of the behavior of transmitting the first signal, the first node monitors the first-type channel to detect the first-type signaling and the second-type signaling in the first resource set.

Embodiment 9

Embodiment 9 illustrates a schematic diagram of a target signaling being used to determine a target time according to one embodiment of the present disclosure; as shown in FIG. 9.

In one embodiment, time-domain resources occupied by the target signaling are used to determine the target time.

In one embodiment, the target time is a start time of time-domain resources occupied by the target signaling.

In one embodiment, the target time is an end time of time-domain resources occupied by the target signaling.

In one embodiment, time-domain resources occupied by the target signaling belong to a first time unit, and the first time unit is used to determine the target time.

In one embodiment, the target time is a start time of the first time unit.

In one embodiment, the target time is an end time of the first time unit.

In one embodiment, the target time is later than a first reference time, and a time interval between the target time and the first reference time is a second interval, the second interval is a non-negative integer.

In one embodiment, the second interval is measured by slot.

In one embodiment, the second interval is measured by symbol.

In one embodiment, the second interval is measured by the time unit.

In one embodiment, the second interval is fixed.

In one embodiment, the second interval is configured by a higher-layer parameter.

In one embodiment, the first reference time is a start time of time-domain resources occupied by the target signaling.

In one embodiment, the first reference time is an end time of time-domain resources occupied by the target signaling.

In one embodiment, the first reference time is a start time of the first time unit.

In one embodiment, the first reference time is an end time of the first time unit.

In one embodiment, the target signaling indicates the target time.

In one embodiment, the target signaling indicates the second interval.

In one embodiment, the target time is not earlier than an end time of time domain resources occupied by the target signaling.

In one embodiment, the target time is not earlier than an end time of the first time unit.

Embodiment 10

Embodiment 10 illustrates a schematic diagram of a first reference signal group being used to determine a first-type receiving quality group according to one embodiment of the present disclosure, as shown in FIG. 10.

In one embodiment, the first reference signal group only comprises one reference signal.

In one embodiment, the first reference signal group comprises more than one reference signal.

In one embodiment, the first reference signal group comprises an SSB.

In one embodiment, the first reference signal group comprises a CSI-RS.

In one embodiment, the first reference signal group comprises a CSI-RS resource.

In one embodiment, the first reference signal group comprises a non-zero CSI-RS.

In one embodiment, any reference signal in the first reference signal group is a CSI-RS resource or an SSB.

In one embodiment, any reference signal in the first reference signal group is a periodic reference signal.

In one embodiment, any reference signal in the first reference signal group is a periodic reference signal or a semi-persistent reference signal.

In one embodiment, all reference signals in the first reference signal group belong to a same carrier.

In one embodiment, all reference signals in the first reference signal group belong to a same BWP.

In one embodiment, all reference signals in the first reference signal group belong to a same cell.

In one embodiment, there exist two reference signals in the first reference signal group respectively belonging to different carriers.

In one embodiment, there exist two reference signals in the first reference signal group respectively belonging to different cells.

In one embodiment, there exist two reference signals in the first reference signal group respectively belonging to different BWPs.

In one embodiment, a number of first-type receiving qualities comprised in the first-type receiving quality group is equal to a number of reference signals comprised in the first reference signal group, and all first-type receiving qualities comprised in the first-type receiving quality group respectively correspond to all reference signals comprised in the first reference signal group.

In one embodiment, the first reference signal group only comprises one reference signal, the first type receiving quality group only comprises one first-type receiving quality, and a measurement performed on the a reference signal is used to determine the a first-type receiving quality.

In one embodiment, the first reference signal group comprises S reference signals, the first-type receiving quality group comprises S first-type receiving qualities, S being a positive integer greater than 1; measurements performed on the S reference signals are respectively used to determine the S first-type receiving qualities.

In one embodiment, for any given reference signal in the first reference signal group, a measurement performed on the given reference signal in a first time interval is used to determine a first-type receiving quality corresponding to the given reference signal.

In one embodiment, for any given reference signal in the first reference signal group, the first node obtains a measurement used to calculate a first-type receiving quality corresponding to the given reference signal only according to the received given reference signal within a first time interval.

In one embodiment, the measurement comprises a channel measurement.

In one embodiment, the measurement comprises an interference measurement.

In one embodiment, the first time interval is a consecutive duration.

In one embodiment, a length of the first time interval is equal to $T_{Evaluate\_BFD\_SSB}$ ms or $T_{Evaluate\_BFD\_CSI-RS}$ ms.

In one embodiment, definitions of $T_{Evaluate\_BFD\_SSB}$ and $T_{Evaluate\_BFD\_CSI-RS}$ can be found in 3GPP TS38.133.

In one embodiment, any first-type receiving quality in the first-type receiving quality group comprises Reference Signal Received Power (RSRP).

In one embodiment, any first-type receiving quality in the first-type receiving quality group comprises L1-RSRP.

In one embodiment, any first-type receiving quality in the first-type receiving quality group is L1-RSRP.

In one embodiment, any first-type receiving quality in the first-type receiving quality group comprises a Signal-to-noise and interference ratio (SINR).

In one embodiment, any first-type receiving quality in the first-type receiving quality group comprises an L1-SINR.

In one embodiment, any first-type receiving quality in the first-type receiving quality group is an L1-SINR.

In one embodiment, any first-type receiving quality in the first-type receiving quality group comprises a BLock Error Rate (BLER).

In one embodiment, any first-type receiving quality in the first-type receiving quality group is a BLER.

In one embodiment, a given reference signal is one reference signal of the first reference signal group.

In one subembodiment of the above embodiment, an RSRP or an L1-RSRP of the given reference signal is used to determine a first-type receiving quality corresponding to the given reference signal.

In one subembodiment of the above embodiment, a first-type receiving quality corresponding to the given reference signal is equal to an RSRP or an L1-RSRP of the given reference signal.

In one subembodiment of the above embodiment, an SINR or an L1-SINR of the given reference signal is used to determine a first-type receiving quality corresponding to the given reference signal.

In one subembodiment of the above embodiment, a first-type receiving quality corresponding to the given reference signal is equal to an SINR or an L1-SINR of the given reference signal.

In one subembodiment of the above embodiment, the given reference signal is any reference signal in the first reference signal group.

In one embodiment, any first-type receiving quality in the first-type receiving quality group is obtained by table looking-up an RSRP, an L1-RSRP, an SINR or an L1-SINR of a corresponding reference signal.

In one embodiment, any first-type receiving quality in the first-type receiving quality group is obtained according to hypothetical PDCCH transmission parameters.

In one embodiment, the specific meaning of the hypothetical PDCCH transmission parameters can be found in 3GPP TS38.133.

Embodiment 11

Embodiment 11 illustrates a schematic diagram of a first node maintaining a first counter according to one embodiment of the present disclosure, as shown in FIG. 11. In embodiment 11, the first-type receiving quality group is used to maintain the first counter.

In one embodiment, if a value of the first counter is not less than the first threshold, the first signal is triggered.

In one embodiment, the first threshold is a positive integer.

In one embodiment, the first threshold is configurable.

In one embodiment, the first threshold is fixed.

In one embodiment, the first threshold is configured by a higher-layer parameter.

In one embodiment, a name of a higher-layer parameter configuring the first threshold includes beamFailureInstanceMaxCount.

In one embodiment, the first threshold is equal to a value of a higher-layer parameter beamFailureInstanceMaxCount.

In one embodiment, the first counter is BFI_COUNTER.

In one embodiment, an initial value of the first counter is 0.

In one embodiment, an initial value of the first counter is a positive integer.

In one embodiment, a value of the first counter is a non-negative integer.

In one embodiment, the first-type receiving quality group is used to determine whether a value of the first counter is increased by 1.

In one embodiment, if each first-type receiving quality in the first-type receiving quality group is worse than a first reference threshold, a value of the first counter is increased by 1.

In one embodiment, if each first-type receiving quality in the first-type receiving quality group is worse than or equal to a first reference threshold, a value of the first counter is increased by 1.

In one embodiment, if at least one first-type receiving quality in the first-type quality group is greater than or equal to the first reference threshold, a value of the first counter remains unchanged.

In one embodiment, if at least one first-type receiving quality in the first-type quality group is greater than the first reference threshold, a value of the first counter remains unchanged.

In one embodiment, if an average value of a first-type receiving quality in the first-type receiving quality group is worse than a first reference threshold, a value of the first counter is increased by 1.

In one embodiment, in response to receiving a beam failure instance indication from a lower layer, a value of the first counter is increased by 1; and the first-type reception quality group is used by the lower layer to determine whether the beam failure instance indication is transmitted.

In one subembodiment of the above embodiment, if each first-type receiving quality in the first-type receiving quality group is worse than a first reference threshold, the lower layer transmits the beam failure instance indication.

In one subembodiment of the above embodiment, if each first-type receiving quality in the first-type receiving quality group is worse than or equal to a first reference threshold, the lower layer transmits the beam failure instance indication.

In one subembodiment of the above embodiment, if at least one first-type receiving quality in the first-type receiving quality group is greater than or equal to a first reference threshold, the lower layer transmits the beam failure instance indication.

In one subembodiment of the above embodiment, if at least one first-type receiving quality in the first-type receiving quality group is greater than a first reference threshold, the lower layer does not transmit the beam failure instance indication.

In one subembodiment of the above embodiment, if an average value of a first-type receiving quality in the first-type receiving quality group is worse than a first reference threshold, the lower layer transmits the beam failure instance indication.

In one subembodiment of the above embodiment, the lower layer comprises a physical layer.

In one embodiment, the first reference threshold is a real number.

In one embodiment, the first reference threshold is a non-negative real number.

In one embodiment, the first reference threshold is a non-negative real number not greater than 1.

In one embodiment, the first reference threshold is equal to one of $Q_{out\_L}$, $Q_{out\_LR\_SSB}$ or $Q_{out\_LR\_CSI-RS}$.

In one embodiment, definitions of the $Q_{out\_L}$, $Q_{out\_LR\_SSB}$ and $Q_{out\_LR\_CSI-RS}$ can be found in 3GPP TS38.133.

In one embodiment, the first reference threshold is determined by a higher-layer parameter rlmInSyncOutOfSyncThreshold.

In one embodiment, if one of a first-type receiving quality is one of an RSRP, an L1-RSRP, an SINR or an L1-SINR and the a first-type receiving quality is less than/greater than the first reference threshold; the a first-type receiving quality is worse than/greater than the first reference threshold.

In one embodiment, if a first-type receiving quality is a BLER and the a first-type receiving quality is greater than/worse than the first reference threshold; the a first-type receiving quality is worse than/greater than the first reference threshold.

In one embodiment, the behavior of maintaining the first counter includes: determining whether a value of the first counter is increased by 1 according to the first-type receiving quality group.

In one embodiment, the behavior of maintaining the first counter includes: initializing a value of the first counter as 0.

In one embodiment, the behavior of maintaining the first counter includes: in response to receiving a beam failure instance indication from a lower layer, starting or restarting a first timer; when the first timer expires, clearing a value of the first counter.

In one embodiment, the first timer is a beamFailureDetectionTimer.

In one embodiment, an initial value of the first timer is a positive integer.

In one embodiment, an initial value of the first timer is a positive real number.

In one embodiment, an initial value of the first timer is configured by a higher-layer parameter beamFailureDetectionTimer.

In one embodiment, an initial value of the first timer is configured by an IE.

In one embodiment, a name of an IE configuring an initial value of the first timer comprises RadioLinkMonitoring.

In one embodiment, the behavior of maintaining the first counter includes: if a random access procedure corresponding to the first signal succeeds, clearing a value of the first counter.

In one embodiment, the behavior of maintaining the first counter includes: if the first node receives a first PDCCH, clearing a value of the first counter; the first signal comprises a BFR MAC CE or a truncated BFR MAC CE, a HARQ process number corresponding to the first signal is a first HARQ process number; the first PDCCH indicates a UL grant of a new transmission corresponding to the first HARQ process number, a CRC of the first PDCCH is scrambled by a C-RNTI.

Embodiment 12

Embodiment 12 illustrates a schematic diagram of M reference signals being used to determine M second-type receiving qualities according to one embodiment of the present disclosure, as shown in FIG. 12.

In one embodiment, the M reference signals comprise a CSI-RS.

In one embodiment, the M reference signals comprise a CSI-RS resource.

In one embodiment, the M reference signals comprise an SSB.

In one embodiment, the M reference signals comprise a CSI-RS and/or an SSB.

In one embodiment, any of the M reference signals is a CSI-RS resource or an SSB.

In one embodiment, for any given reference signal in the M reference signals, a measurement performed on the given reference signal within a second time interval is used to determine a second-type receiving quality corresponding to the given reference signal.

In one embodiment, for any given reference signal in the M reference signals, the first node obtains a measurement used to calculate a second-type receiving quality corresponding to the given reference signal only according to the given reference signal received within a second time interval.

In one embodiment, the second time interval is a consecutive duration.

In one embodiment, a length of the second time interval is equal to $T_{Evaluate\_CBD\_SSB}$ ms or $T_{Evaluate\_CBD\_CSI-RS}$ ms.

In one embodiment, definitions of $T_{Evaluate\_CBD\_SSB}$ or $T_{Evaluate\_CBD\_CSI-RS}$ can be found in 3GPP TS38.133.

In one embodiment, any of the M second-type receiving qualities is an RSRP.

In one embodiment, any of the M second-type receiving qualities is an L1-RSRP.

In one embodiment, any of the M second-type receiving qualities is an SINR.

In one embodiment, any of the M second-type receiving qualities is an L1-SINR.

In one embodiment, any of the M second-type receiving qualities is a BLER.

In one embodiment, a given reference signal is one of the M reference signals.

In one subembodiment of the above embodiment, an RSRP or an L1-RSRP of the given reference signal is used to determine a second-type receiving quality corresponding to the given reference signal.

In one subembodiment of the above embodiment, a second-type receiving quality corresponding to the given reference signal is equal to an RSRP or an L1-RSRP of the given reference signal.

In one subembodiment of the above embodiment, a second-type receiving quality corresponding to the given reference signal is equal to an L1-RSRP after received power of the given reference signal is scaled according to a value indicated by a higher-layer parameter powerControlOffsetSS.

In one subembodiment of the above embodiment, an SINR or an L1-SINR of the given reference signal is used to determine a second-type receiving quality corresponding to the given reference signal.

In one subembodiment of the above embodiment, a second-type receiving quality corresponding to the given reference signal is equal to an SINR or an L1-SINR of the given reference signal.

In one subembodiment of the above embodiment, a second-type receiving quality corresponding to the given reference signal is equal to an L1-SINR after received power of the given reference signal is scaled according to a value indicated by a higher-layer parameter powerControlOffsetSS.

In one subembodiment of the above embodiment, the given reference signal is any of the M reference signals.

In one embodiment, any of the M second-type receiving qualities is obtained by table looking-up an RSRP, an L1-RSRP, an SINR or an L1-SINR of a corresponding reference signal.

In one embodiment, one of the M second-type receiving qualities corresponding to the first reference signal is not worse than a second reference threshold.

In one embodiment, the second reference threshold is a real number.

In one embodiment, the second reference threshold is a non-negative real number.

In one embodiment, the second reference threshold is a non-negative real number not greater than 1.

In one embodiment, the second reference threshold is equal to $Q_{in\_LR}$.

In one embodiment, the definition of $Q_{in\_LR}$ can be found in 3GPP TS38.133.

In one embodiment, the second reference threshold is configured by a higher-layer parameter rsrp-ThresholdSSB.

In one embodiment, the second reference threshold is configured by a higher-layer parameter rsrp-ThresholdCSI-RS.

In one embodiment, the M second-type receiving qualities respectively correspond to M reference thresholds; a second-type receiving quality corresponding to the first reference signal is not worse than a corresponding reference threshold; and there exist two unequal reference thresholds in the M reference thresholds.

In one embodiment, any of the M reference thresholds is a real number.

In one embodiment, any of the M reference thresholds is a non-negative real number.

In one embodiment, there exist two equal reference thresholds in the M reference thresholds.

In one embodiment, any of the M reference thresholds is configured by a higher-layer parameter.

In one embodiment, if one of a second-type receiving quality is one of an RSRP, an L1-RSRP, an SINR or an L1-SINR and the a second-type receiving quality is greater than or equal to a reference threshold, the a second-type quality is not worse than the a reference threshold.

In one embodiment, if one of a second-type receiving quality is a BLER and the a second-type receiving quality is less than or equal to a reference threshold, the a second-type quality is not worse than the a reference threshold.

In one embodiment, after receiving a request from a higher layer, a physical layer of the first node transmits a second information block to a higher layer; herein, the second information indicates M1 reference signal(s) and M1 second-type receiving quality(qualities), any of the M1 reference signal(s) is one of the M reference signals, M1 being a positive integer not greater than M; the M1 second-type receiving quality(qualities) is(are respectively) second-type receiving quality(qualities) in the M second-type receiving qualities corresponding to the M1 reference signal(s).

In one subembodiment of the above embodiment, M1 is equal to 1.

In one subembodiment of the above embodiment, M1 is greater than 1.

In one subembodiment of the above embodiment, any of the M1 second-type receiving quality(qualities) is not worse than the second reference threshold.

In one subembodiment of the above embodiment, any of the M1 second-type receiving quality(qualities) is not worse than a reference threshold corresponding to the M reference thresholds.

In one subembodiment of the above embodiment, the first reference signal is one of the M1 reference signal(s).

In one subembodiment of the above embodiment, the second reference signal is one of the M1 reference signal(s).

Embodiment 13

Figure 13:
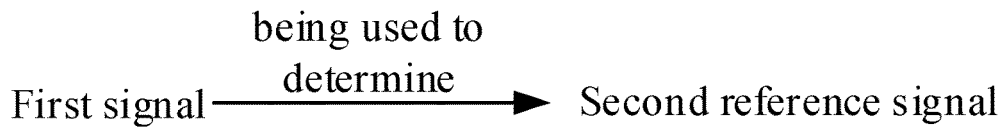
FIG. 13 illustrates a schematic diagram of a first signal being used to determine a second reference signal according to one embodiment of the present disclosure.

Embodiment 13 illustrates a schematic diagram of a first signal being used to determine a second reference signal according to one embodiment of the present disclosure, as shown in FIG. 13.

In one embodiment, the first signal is used by the second node to determine the second reference signal.

In one embodiment, the second reference signal comprises a downlink reference signal.

In one embodiment, the second reference signal comprises an uplink reference signal.

In one embodiment, the second reference signal comprises a CSI-RS.

In one embodiment, the second reference signal comprises CSI-RS resources.

In one embodiment, the second reference signal comprises an NZP CSI-RS.

In one embodiment, the second reference signal comprises an SSB.

In one embodiment, the second reference signal comprises an SRS.

In one embodiment, the second reference signal is a CSI-RS resource or an SSB.

In one embodiment, the second reference signal is a periodic reference signal.

In one embodiment, the second reference signal is a semi-persistent reference signal.

In one embodiment, the second reference signal and the first reference signal are QCL.

In one embodiment, the second reference signal and the first reference signal are QCL corresponding to QCL-TypeD.

In one embodiment, the second reference signal and the first reference signal are not QCL.

In one embodiment, the first signal indicates the second reference signal.

In one embodiment, time-frequency resources occupied by the first signal are used to determine the second reference signal.

In one embodiment, PRACH resources occupied by the first signal are used to determine the second reference signal.

In one embodiment, the first signal occupies two PRACH resources, one of the two PRACH resources is used to determine the first reference signal, and the other one of the two PRACH resources is used to determine the second reference signal.

In one embodiment, the first signal carries a second bit string, and the second bit string comprises at least one binary bit; and a value of the second bit string indicates the second reference signal.

In one embodiment, a channel occupied by the first signal comprises a PUSCH, and a part of the first signal transmitted in a PUSCH indicates the second reference signal.

In one embodiment, a channel occupied by the first signal comprises a PUCCH and a PUSCH, and a part of the first signal transmitted in a PUCCH and a PUSCH indicates the second reference signal.

In one embodiment, a channel occupied by the first signal comprises a PRACH and a PUSCH, a part of the first signal transmitted in a PRACH is used to determine the first reference signal, and a part of the first signal transmitted in a PUSCH is used to determine the second reference signal.

In one subembodiment of the above embodiment, a part of the first signal transmitted in a PUSCH indicates the second reference signal.

In one embodiment, a channel occupied by the first signal comprises a PRACH, a PUCCH and a PUSCH, a part of the first signal transmitted in a PRACH is used to determine the first reference signal, and a part of the first signal transmitted in a PUCCH and a PUSCH is used to determine the second reference signal.

In one embodiment, the first signal comprises a random access preamble and a MAC CE; the a random access preamble is used to determine the first reference signal, and the a MAC CE is used to determine the second reference signal.

In one subembodiment of the above embodiment, the a MAC CE indicates the second reference signal.

In one subembodiment of the above embodiment, the a MAC CE is a BFR MAC CE or a truncated BFR MAC CE.

In one embodiment, the first reference signal is used to determine the second reference signal.

In one embodiment, the first reference signal is one of the M reference signals, the second reference signal is one of M specified reference signals, and the M reference signals respectively correspond to the M specified reference signals; the second reference signal is one of the M specific reference signals corresponding to the first reference signal.

In one subembodiment of the above embodiment, the M specific reference signals comprise a CSI-RS and/or an SSB.

In one subembodiment of the above embodiment, any of the M specific reference signals and a corresponding one of the M reference signals are QCL.

In one embodiment, the second reference signal is one of the M reference signals.

In one embodiment, one of the M second-type receiving qualities corresponding to the second reference signal is not worse than the second reference threshold.

In one embodiment, one of the M second-type receiving qualities corresponding to the second reference signal is not worse than one of the M reference thresholds corresponding to the second reference signal.

Embodiment 14

Figure 14:
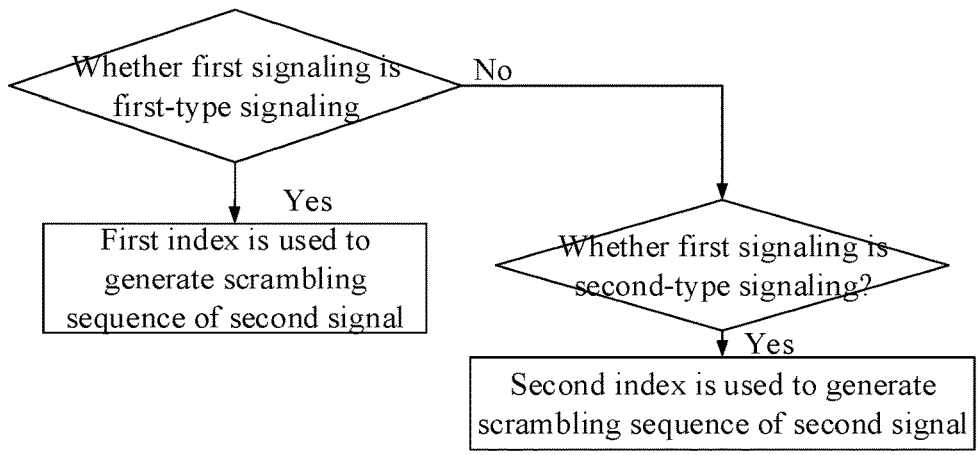
FIG. 14 illustrates a schematic diagram of a relation between a first signaling and a scrambling sequence of a second signal according to one embodiment of the present disclosure.

Embodiment 14 illustrates a schematic diagram of a relation between a first signaling and a scrambling sequence of a second signal according to one embodiment of the present disclosure, as shown in FIG. 14. In embodiment 14, if the first signaling is a said first-type signaling, the first index is used to generate the scrambling sequence of the second signal; and if the first signaling is a said second-type signaling, the second index is used to generate the scrambling sequence of the second signal.

In one embodiment, if the first signaling is a said first-type signaling, the scrambling sequence of the second signal is independent of the second index; and if the first signaling is a said second-type signaling, the scrambling sequence of the second signal is independent of the first index.

In one embodiment, the first signaling is a said first-type signaling.

In one embodiment, the first signaling is a said second-type signaling.

In one embodiment, the first signaling is a said first-type signaling; and the first signaling is transmitted in the first resource set.

In one embodiment, the first signaling is a said second-type signaling; and the first signaling is transmitted in the second resource set.

In one embodiment, the first signaling is a said first-type signaling; and the first node detects the first signaling by monitoring the first-type channel in the first resource set.

In one embodiment, the first signaling is a said second-type signaling; and the first node detects the first signaling by monitoring the first-type channel in the second resource set.

In one embodiment, the first signaling comprises the scheduling information of the second signal.

In one embodiment, the first signaling indicates the scheduling information of the first signal.

In one embodiment, the second signal comprises a baseband signal.

In one embodiment, the second signal comprises a radio signal.

In one embodiment, the second signal comprises a radio-frequency signal.

In one embodiment, the second signal carries the target signal.

In one embodiment, the target signaling is transmitted in a PDSCH carrying the second signal.

In one embodiment, the first index and the second index are respectively non-negative integers.

In one embodiment, the first index is an RNTI, and the second index is an RNTI.

In one embodiment, the first index corresponds to a first RNTI and the second index corresponds to a second RNTI; and the first RNTI is not equal to the second RNTI.

In one embodiment, the first index is equal to the first RNTI and the second index is equal to the second RNTI.

In one embodiment, the first RNTI is used to generate the first index, and the second RNTI is used to generate the second index.

In one embodiment, the first RNTI is a UE specific RNTI.

In one embodiment, the second RNTI is a UE specific RNTI.

In one embodiment, the second RNTI is a group common RNTI.

In one embodiment, the first RNTI is a C-RNTI.

In one embodiment, the second RNTI is one of a G-RNTI, M-RNTI, GC-RNTI or SC-PTM-RNTI.

In one embodiment, the first RNTI belongs to the first identifier set.

In one embodiment, the second RNTI belongs to the second identifier set.

In one embodiment, the second RNTI does not belong to the second identifier set.

In one embodiment, the first RNTI is an RNTI used to scramble a CRC of the first-type signaling.

In one embodiment, the second RNTI is an RNTI used to scramble a CRC of the second-type signaling.

In one embodiment, the second RNTI is different from an RNTI used to scramble a CRC of the second-type signaling.

In one embodiment, the second signal carries a first bit block, and a first bit sequence comprises an output after bits in the first bit block sequentially through CRC Attachment, Code Block Segmentation, Code Block CRC Attachment, Channel Coding, Rate Matching and Concatenation; the first bit sequence is scrambled by the scrambling sequence of the second signal to obtain a second bit sequence; and the second bit sequence is used to generate the second signal.

In one subembodiment of the above embodiment, the second signal comprises an output after bits in the second bit sequence sequentially through Modulation, Layer Mapping, Antenna Port Mapping, Mapping to Virtual Resource Blocks, Mapping from Virtual to Physical Resource Blocks, multi carrier symbol generation, and modulation and up conversion.

In one embodiment, the first bit block is one of a Transport Block (TB), a Code Block (CB) or a Code Block Group (CBG).

In one embodiment, the scrambling sequence of the second signal comprises more than one binary bit.

In one embodiment, the scrambling sequence of the second signal is a binary bit sequence.

In one embodiment, the scrambling sequence of the second signal is a pseudo-random sequence.

In one embodiment, the scrambling sequence of the second signal is generated according to a method in 3GPP TS38.211, section 5.2.1.

In one embodiment, the scrambling sequence of the second signal is equal to a sum of a first sequence and a second sequence modulo 2, and the first sequence and the second sequence are binary bit sequences respectively; the first sequence is fixed; when the first signaling is a said first-type signaling, the first index is used to determine an initial value of the second sequence; and when the first signaling is a said second-type signaling, the second index is used to determine an initial value of the second sequence.

In one embodiment, the first sequence and the second sequence are respectively Gold sequences.

In one embodiment, the first sequence and the second sequence are respectively generated by a Gold sequence with a length of 31.

In one embodiment, the first sequence and the second sequence are respectively m-sequences.

In one embodiment, when the first signaling is the first-type signaling, an initial value of the second sequence is equal to a product of the first index and a first coefficient plus a second component plus a third component; the first coefficient, the second component and the third component are respectively non-negative integers.

In one subembodiment of the above embodiment, the first coefficient is equal to 15th power of 2.

In one subembodiment of the above embodiment, the second component is equal to 14th power of 0 or 2.

In one subembodiment of the above embodiment, the third component is configured by a higher-layer parameter.

In one embodiment, when the first signaling is the second-type signaling, an initial value of the second sequence is equal to a product of the second index and a second coefficient plus a fourth component plus a fifth component; the second coefficient, the fourth component and the fifth component are respectively non-negative integers.

In one subembodiment of the above embodiment, the second coefficient is equal to 15th power of 2.

In one subembodiment of the above embodiment, the fourth component is equal to 14th power of 0 or 2.

In one subembodiment of the above embodiment, the fifth component is configured by a higher-layer parameter.

In one subembodiment of the above embodiment, a physical-layer cell ID of a cell maintained by a transmitter of the first signaling is used to determine the fifth component.

Embodiment 15

Figure 15:
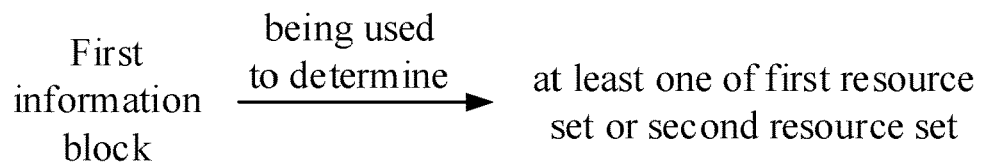
FIG. 15 illustrates a schematic diagram of a first information block according to one embodiment of the present disclosure.

Embodiment 15 illustrates a schematic diagram of a first information block according to one embodiment of the present disclosure, as shown in FIG. 15. In embodiment 15, the first information block is used to determine at least a said first resource set or the second resource set.

In one embodiment, the first information block indicates time-frequency resources occupied by the first resource set.

In one embodiment, the first information block indicates time-frequency resources occupied by the second resource set.

In one embodiment, the first information block is carried by a higher-layer signaling.

In one embodiment, the first information block is carried by an RRC signaling.

In one embodiment, the first information block is carried by a MAC CE signaling.

In one embodiment, the first information block is carried by a Master Information Block (MIB).

In one embodiment, the first information block is carried by an SIB.

In one embodiment, the first information block comprises all or partial fields in an IE.

In one embodiment, the first information block comprises information in a plurality of IEs.

In one embodiment, the first information is carried by an MIB and a higher-layer signaling together.

In one embodiment, the first information is carried by an MIB and an IE together.

In one embodiment, a name of an IE carrying the first information block comprises BeamFailureRecovery.

Embodiment 16

Figure 16:
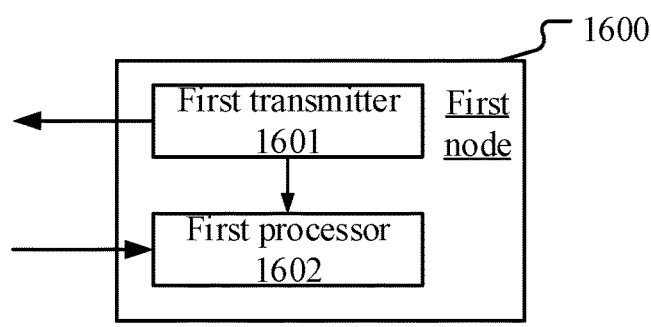
FIG. 16 illustrates a structure block diagram of a processing device in a first node according to one embodiment of the present disclosure.

Embodiment 16 illustrates a structure block diagram of a processing device in a first node according to one embodiment of the present disclosure, as shown in FIG. 16. In FIG. 16, the processing device 1600 in the first node comprises a first transmitter 1601 and a first processor 1602.

In embodiment 16, the first transmitter 1601 transmits a first signal; a first processor 1602, in response to the behavior of transmitting the first signal, monitors a first-type channel to detect a first-type signaling in a first resource set; the first processor 1602, monitors the first-type channel to detect a second-type signaling in a second resource set; the first processor 1602 receives a target signaling; the first processor 1602, in response to the behavior of receiving the target signaling, stops monitoring the first-type channel to detect the first-type signaling in the first resource set after a target time or stops monitoring the first-type channel to detect the second-type signaling in the second resource set after the target time.

In embodiment 16, the target signaling is used to determine the target time; the first signal is used for random access, and the first signal is used to determine a first reference signal; for the first-type channel monitoring performed in the first resource set, the first node assumes QCL parameters same as the first reference signal; the target signaling is a third-type signaling or a fourth-type signaling; when the target signaling is a said third-type signaling, the first node stops monitoring the first-type channel to detect the first-type signaling in the first resource set after the target time; and when the target signaling is a said fourth-type signaling, the first node stops monitoring the first-type channel to detect the second-type signaling in the second resource set after the target time.

In one embodiment, the first processor 1602 receives a first reference signal group to determine a first-type receiving quality and maintain a first counter; herein, the first reference signal group comprises at least one reference signal, and the first-type receiving quality group comprises at least one first-type receiving quality; the first-type receiving quality group is used to maintain the first counter; and in response to a value of the first counter being not less than a first threshold, the first signal is triggered.

In one embodiment, the first processor 1602 receives M reference signals, M being a positive integer greater than 1; herein, measurements performed on the M reference signals are respectively used to determine M second-type receiving qualities; and the first reference signal is one of the M reference signals.

In one embodiment, for the first-type channel monitoring performed in the second resource set, the first node assumes QCL parameters same as the first reference signal.

In one embodiment, the first signal is used to determine a second reference signal; for the first-type channel monitoring performed in the second resource set, the first node assumes QCL parameters same as the second reference signal.

In one embodiment, the first processor 1602 receives at least one of a first signaling or a second signal; herein, the first signaling is used to determine scheduling information of the second signal; the first signaling is a said first-type signaling or a said second-type signaling; when the first signaling is a said first-type signaling, a first index is used to generate a scrambling sequence of the second signal; when the first signaling is a said second-type signaling, a second index is used to generate a scrambling sequence of the second signal; the first index and the second index are respectively integers, and the first index is not equal to the second index.

In one embodiment, the first processor 1602 receives a first information block; herein, the first information block is used to determine the first resource set.

In one embodiment, the first processor 1602 receives a first information block; herein, the first information block is used to determine the second resource set.

In one embodiment, the first processor 1602 receives a first information block; herein, the first information block is used to determine the first resource set and the second resource set.

In one embodiment, the first node is a UE.

In one embodiment, the first node is a relay node.

In one embodiment, the first transmitter 1601 comprises at least one of the antenna 452, the transmitter 454, the transmitting processor 468, the multi-antenna transmitting processor 457, the controller/processor 459, the memory 460, or the data source 467 in Embodiment 4.

In one embodiment, the first processor 1602 comprises at least one of the antenna 452, the receiver 454, the receiving processor 456, the multi-antenna receiving processor 458, the controller/processor 459, the memory 460, or the data source 467 in Embodiment 4.

Embodiment 17

Figure 17:
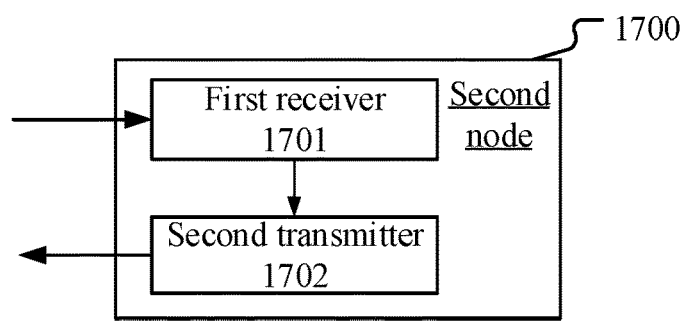
FIG. 17 illustrates a structure block diagram of a processing device in a second node according to one embodiment of the present disclosure.

Embodiment 17 illustrates a structure block diagram of a processing device in a second node according to one embodiment of the present disclosure, as shown in FIG. 17.

In FIG. 17, a processing device 1700 in a second node comprises a first receiver 1701 and a second transmitter 1702.

In Embodiment 17, the first receiver 1701 receives a first signal; the second transmitter 1702 transmits a first-type signaling in a first resource set; the second transmitter 1702 transmits a second-type signaling in a second resource set; the second transmitter 1702 transmits a target signaling; the second transmitter 1702 stops transmitting the first-type signaling in the first resource set after the target time, or, stops transmitting the second-type signaling in the second resource set after the target time.

In embodiment 17, the target signaling is used to determine the target time; the first signal is used for random access, and the first signal is used to determine a first reference signal; in response to a behavior of transmitting the first signal, a transmitter of the first signal monitors a first-type channel to detect the first-type signaling in the first resource set and monitors the first-type signaling to detect the second-type signaling in the second resource set; for the first-type channel monitoring performed in the first resource set, the transmitter of the first signal assumes a QCL parameter same as the first reference signal; the target signaling is a third-type signaling or a fourth-type signaling; when the target signaling is a said third-type signaling, the second node stops transmitting the first-type signaling in the first resource set after the target time; and when the target signaling is a said fourth-type signaling, the second node stops transmitting the second-type signaling in the second resource set after the target time.

In one embodiment, the second transmitter 1702 transmits a first reference signal group; herein, a measurement performed on the first reference signal group is used to determine a first-type receiving quality group, the first reference signal group comprises at least one reference signal, and the first-type receiving quality group comprises at least one first-type receiving quality; the first-type receiving quality group is used to maintain a first counter; and in response to a value of the first counter being not less than a first threshold, the first signal is triggered.

In one embodiment, the second transmitter 1702 transmits M reference signals, M being a positive integer greater than 1; herein, measurements performed on the M reference signals are respectively used to determine M second-type receiving qualities; and the first reference signal is one of the M reference signals.

In one embodiment, for the first-type channel monitoring performed in the second resource set, the transmitter of the first signal assumes a QCL parameter same as the first reference signal.

In one embodiment, the first signal is used to determine a second reference signal; for the first-type channel monitoring performed in the second resource set, the transmitter of the first signal assumes a QCL parameter same as the second reference signal.

In one embodiment, the second transmitter 1702 transmits at least one of a first signaling or a second signal; herein, the first signaling is used to determine scheduling information of the second signal; the first signaling is a said first-type signaling or a said second-type signaling; when the first signaling is a said first-type signaling, a first index is used to generate a scrambling sequence of the second signal; when the first signaling is a said second-type signaling, a second index is used to generate a scrambling sequence of the second signal; the first index and the second index are respectively integers, and the first index is not equal to the second index.

In one embodiment, the second transmitter 1702 transmits a first information block; herein, the first information block is used to determine the first resource set.

In one embodiment, the second transmitter 1702 transmits a first information block; herein, the first information block is used to determine the second resource set.

In one embodiment, the second transmitter 1702 transmits a first information block; herein, the first information block is used to determine the first resource set and the second resource set.

In one embodiment, the second node is a base station.

In one embodiment, the second node is a UE.

In one embodiment, the second node is a relay node.

In one embodiment, the first receiver 1701 comprises at least one of the antenna 420, the receiver 418, the receiving processor 470, the multi-antenna receiving processor 472, the controller/processor 475, the memory 476 in Embodiment 4.

In one embodiment, the second transmitter 1702 comprises at least one of the antenna 420, the transmitter 418, the transmitting processor 416, the multi-antenna transmitting processor 471, the controller/processor 475, or the memory 476 in Embodiment 4.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The user equipment, terminal and UE include but are not limited to Unmanned Aerial Vehicles (UAVs), communication modules on UAVs, telecontrolled aircrafts, aircrafts, diminutive airplanes, mobile phones, tablet computers, notebooks, vehicle-mounted communication equipment, vehicles, cars, RSUs, wireless sensors, network cards, Internet of Things (IoT) terminals, RFID terminals, NB-IOT terminals, Machine Type Communication (MTC) terminals, enhanced MTC (eMTC) terminals, data card, network cards, vehicle-mounted communication equipment, low-cost mobile phones, low-cost tablets and other wireless communication devices. The base station or system equipment in the present disclosure includes but is not limited to macro-cellular base stations, micro-cellular base stations, Pico base stations, home base stations, relay base stations, eNB, gNB, Transmitter Receiver Points (TRPs), GNSS, relay satellites, satellite base stations, space base stations, RSUs, UAVs, test devices, such as a transceiver or a signaling tester that simulates some functions of a base station, and other wireless communication devices.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first transmitter, transmitting a first signal;
a first processor, in response to the behavior of transmitting the first signal, monitoring a first-type channel in a first resource set to detect a first-type signaling;

the first processor, monitoring the first-type channel in a second resource set to detect a second-type signaling;

the first processor, receiving a target signaling, the target signaling being used to determine a target time; and the first processor, in response to the behavior of receiving the target signaling, stopping monitoring the first-type channel in the first resource set after the target time to detect the first-type signaling or stopping monitoring the first-type channel in the second resource set after the target time to detect the second-type signaling;

wherein the first signal is used for random access, and the first signal is used to determine a first reference signal; the first-type signaling is for unicast service, and the second-type signaling is for Point-To-Multipoint (PTM) or multicast service; for the first-type channel monitoring performed in the first resource set, the first node assumes Quasi-Co-Located (QCL) parameters same as the first reference signal; the target signaling is a third-type signaling or a fourth-type signaling; when the target signaling is a said third-type signaling, the first node stops monitoring the first-type channel in the first resource set after the target time to detect the first-type signaling; and when the target signaling is a said fourth-type signaling, the first node stops monitoring the first-type channel in the second resource set after the target time to detect the second-type signaling.

2. The first node according to claim 1, wherein the first processor receives a first reference signal group to determine a first-type receiving quality group and maintain a first counter; wherein the first reference signal group comprises at least one reference signal, and the first-type receiving quality group comprises at least one first-type receiving quality; the first-type receiving quality group is used to maintain the first counter; and in response to a value of the first counter being not less than a first threshold, the first signal is triggered.

3. The first node according to claim 1, wherein the first processor receives M reference signals, M being a positive integers greater than 1; wherein measurements performed on the M reference signals are respectively used to determine M second-type receiving qualities;

and the first reference signal is one of the M reference signals.

4. The first node according to claim 1, wherein for the first-type channel monitoring performed in the second resource set, the first node assumes QCL parameters same as the first reference signal.

5. The first node according to claim 1, wherein the first signal is used to determine a second reference signal; for the first-type channel monitoring performed in the second resource set, the first node assumes QCL parameters same as the second reference signal.

6. The first node according to claim 1, wherein the first processor receives at least one of a first signaling or a second signal; wherein the first signaling is used to determine scheduling information of the second signal; the first signaling is a said first-type signaling or a said second-type signaling; when the first signaling is a said first-type signaling, a first index is used to generate a scrambling sequence of the second signal; when the first signaling is a said second-type signaling, a second index is used to generate a scrambling sequence of the second signal; the first index and the second index are respectively integers, and the first index is not equal to the second index.

7. The first node according to claim 1, wherein the first processor receives a first information block; wherein the first information block is used to determine at least one of the first resource set or the second resource set.

8. A second node for wireless communications, comprising:

a first receiver, receiving a first signal;

a second transmitter, transmitting a first-type signaling in a first resource set;

the second transmitter, transmitting a second-type signaling in a second resource set;

the second transmitter, transmitting a target signaling, the target signaling being used to determine a target time; and the second transmitter, stopping transmitting the first-type signaling in the first resource set after the target time, or, stopping transmitting the second-type signaling in the second resource set after the target time;

wherein the first signal is used for random access, and the first signal is used to determine a first reference signal; in response to a behavior of transmitting the first signal, a transmitter of the first signal monitors a first-type channel in the first resource set to detect the first-type signaling and monitors the first-type signaling in the second resource set to detect the second-type signaling; the first-type signaling is for unicast service, and the second-type signaling is for Point-To-Multipoint (PTM) or multicast service; for the first-type channel monitoring performed in the first resource set, the transmitter of the first signal assumes Quasi-Co-Located (QCL) parameters same as the first reference signal; the target signaling is a third-type signaling or a fourth-type signaling; when the target signaling is a said third-type signaling, the second node stops transmitting the first-type signaling in the first resource set after the target time; and when the target signaling is a said fourth-type signaling, the second node stops transmitting the second-type signaling in the second resource set after the target time.

9. The second node according to claim 8, wherein the second transmitter transmits a first reference signal group; wherein a measurement performed on the first reference signal group is used to determine a first-type receiving quality group, the first reference signal group comprises at least one reference signal, and the first-type receiving quality group comprises at least one first-type receiving quality; the first-type receiving quality group is used to maintain a first counter; in response to a value of the first counter being not less than a first threshold, the first signal is triggered.

10. The second node according to claim 8, wherein the second transmitter transmits M reference signals, M being a positive integer greater than 1; wherein measurements performed on the M reference signals are respectively used to determine M second-type receiving qualities; and the first reference signal is one of the M reference signals.

11. The second node according to claim 8, wherein for the first-type channel monitoring performed in the second resource set, the transmitter of the first signal assumes QCL parameters same as the first reference signal.

12. The second node according to claim 8, wherein the first signal is used to determine a second reference signal; for the first-type channel monitoring performed in the second resource set, the transmitter of the first signal assumes QCL parameters same as the second reference signal.

13. The second node according to claim 8, wherein the second transmitter transmits at least one of a first signaling or a second signal; wherein the first signaling is used to determine scheduling information of the second signal; the first signaling is a said first-type signaling or a said second-type signaling; when the first signaling is a said first-type signaling, a first index is used to generate a scrambling sequence of the second signal; when the first signaling is a said second-type signaling, a second index is used to generate a scrambling sequence of the second signal; the first index and the second index are respectively integers, and the first index is not equal to the second index.

14. The second node according to claim 8, wherein the second transmitter transmits a first information block; wherein the first information block is used to determine at least one of the first resource set or the second resource set.

15. A method in a first node for wireless communications, comprising:
  transmitting a first signal;
  in response to the behavior of transmitting the first signal, monitoring a first-type channel in a first resource set to detect a first-type signaling;
  monitoring the first-type channel in a second resource set to detect a second-type signaling;
  receiving a target signaling, the target signaling being used to determine a target time; and
  in response to the behavior of receiving the target signaling, stopping monitoring the first-type channel in the first resource set after the target time to detect the first-type signaling or stopping monitoring the first-type channel in the second resource set after the target time to detect the second-type signaling;
  wherein the first signal is used for random access, and the first signal is used to determine a first reference signal; the first-type signaling is for unicast service, and the second-type signaling is for Point-To-Multipoint (PTM) or multicast service; for the first-type channel monitoring performed in the first resource set, the first node assumes Quasi-Co-Located (QCL) parameters same as the first reference signal; the target signaling is a third-type signaling or a fourth-type signaling; when the target signaling is a said third-type signaling, the first node stops monitoring the first-type channel in the first resource set after the target time to detect the first-type signaling; and when the target signaling is a said fourth-type signaling, the first node stops monitoring the first-type channel in the second resource set after the target time to detect the second-type signaling.

16. The method according to claim 15, comprising:
  receiving a first reference signal group to determine a first-type receiving quality group; and
  maintaining a first counter;
  wherein the first reference signal group comprises at least one reference signal, and the first-type receiving quality group comprises at least one first-type receiving quality; the first-type receiving quality group is used to maintain the first counter; and in response to a value of the first counter being not less than a first threshold, the first signal is triggered.

17. The method according to claim 15, comprising:
  receiving M reference signals, M being a positive integer greater than 1;
  wherein measurements performed on the M reference signals are respectively used to determine M second-type receiving qualities; and the first reference signal is one of the M reference signals.

18. The method according to claim 15, wherein for the first-type channel monitoring performed in the second resource set, the first node assumes QCL parameters same as the first reference signal.

19. The method according to claim 15, wherein the first signal is used to determine a second reference signal; for the first-type channel monitoring performed in the second resource set, the first node assumes QCL parameters same as the second reference signal.

20. The method according to claim 15, comprising at least one of the following:
  receiving a first signaling;
  receiving a second signal; and
  receiving a first information block;
  wherein the first signaling is used to determine scheduling information of the second signal; the first signaling is a said first-type signaling or a said second-type signaling; when the first signaling is a said first-type signaling, a first index is used to generate a scrambling sequence of the second signal; when the first signaling is a said second-type signaling, a second index is used to generate a scrambling sequence of the second signal; the first index and the second index are respectively integers, and the first index is not equal to the second index; the first information block is used to determine at least one of the first resource set or the second resource set.

\* \* \* \* \*